United States Patent [19]

Maruyama et al.

[11] Patent Number: 5,708,510
[45] Date of Patent: Jan. 13, 1998

[54] CODE CONVERSION SYSTEM

[75] Inventors: Kazuhiko Maruyama; Shigenori Kino; Hisafumi Ozawa, all of Kamakura, Japan

[73] Assignee: Mitsubishi Denki Kabushiki Kaisha, Tokyo, Japan

[21] Appl. No.: 442,416

[22] Filed: May 16, 1995

[30] Foreign Application Priority Data

May 16, 1994 [JP] Japan ................. 6-100872

[51] Int. Cl.$^6$ ............................ H04N 1/41
[52] U.S. Cl. ............ 358/426; 358/261.1; 358/427; 382/247
[58] Field of Search .............. 358/261.1, 261.3, 358/427, 426, 261.2, 261.4; 382/247, 246, 245

[56] References Cited

U.S. PATENT DOCUMENTS

| | | |
|---|---|---|
| 4,488,143 | 12/1984 | Martin . |
| 5,059,976 | 10/1991 | Ono et al. . |
| 5,297,220 | 3/1994 | Nomizu ................. 382/247 |
| 5,307,062 | 4/1994 | Ono et al. . |
| 5,309,381 | 5/1994 | Fukui .................. 382/427 |
| 5,313,204 | 5/1994 | Semasa et al. . |
| 5,317,416 | 5/1994 | Tsuboi et al. .......... 358/426 |
| 5,317,428 | 5/1994 | Osawa et al. .......... 358/427 |
| 5,321,521 | 6/1994 | Nomizu ............... 358/426 |
| 5,331,426 | 7/1994 | Kato et al. ............ 358/426 |
| 5,381,145 | 1/1995 | Allen et al. ........... 358/426 |
| 5,384,644 | 1/1995 | Yamagami ............ 358/426 |
| 5,422,734 | 6/1995 | Kang .................. 382/426 |
| 5,442,458 | 8/1995 | Rabbani et al. ....... 358/261.3 |

OTHER PUBLICATIONS

ITU-T "Terminal Equipment and Protocols for Telematic Services", Mar., 1993.
"Standardization of Group 3 Facsimile Apparatus for Document Transmission", Geneva, 1980.

*Primary Examiner*—Edward L. Coles, Sr.
*Assistant Examiner*—Fan Lee
*Attorney, Agent, or Firm*—Wolf, Greenfield & Sacks, P.C.

[57] ABSTRACT

A code conversion system converts an MH code into an arithmetic code. In code conversion system, a template 93 which is necessary for an arithmetic decoding process is obtained in such a manner that MH code words corresponding to the template 93, which are derived from already MH coded reference lines 90 and 91 respectively, are decoded, and the decoded data are shifted in three shift registers A77, B72 or C80. By means of a signal indicative of completion of the arithmetic decoding process in an arithmetic decoding device 71 and a signal indicative of completion of a shift-in process in shift registers A77 and so on, the process of the arithmetic decoding device 71, a decoding process of an MH code word in an MH decoding device and an MH coding process in an MH coding device 74 can be executed simultaneously.

16 Claims, 23 Drawing Sheets

CODE CONVERSION SYSTEM

BACKGROUND OF THE INVENTION

1. Field of the Invention

The present invention relates generally to a code conversion system for converting coding system to be employed in a facsimile communication and so forth. More specifically, the invention relates to a code conversion system capable of mutual conversion between an arithmetic coding system and one dimensional coding system.

2. Description of the Related Art

Conventionally, as a code conversion system there is a code conversion system as disclosed in Japanese Unexamined Patent Publication (Kokai) No. Showa 62-14578 (Jp-A-62 014578). FIG. 25 is an illustration showing a construction of a code conversion system similar to the above-identified publication.

Here, MH code, MR code, MMR code and so forth are coding systems to be employed in facsimile communication and so forth. A microcomputer 132 performs code conversion. A code output circuit 133 includes a parallel/serial conversion circuit for MH code, MR code or MMR code. A code word/absolute coordinate conversion system 134 derives an absolute coordinate of a pixel variation point from a line start point. A line buffer 135 records the absolute coordinate from the line start point of the pixel variation point obtained in the code word/absolute coordinate conversion system 134. An absolute coordinate/code word conversion system 136 performs conversion from the absolute coordinate into MH code, MR mode or MMR code. With the construction set forth above, mutual conversion of coding system between MH code, MR code and MMR code is performed.

The operation of the code conversion system set forth above will be discussed with reference to FIG. 26. MH code, MR code or MMR code input to a code separator 131 is separated into code words (st202) and then input to the code word/absolute coordinate conversion system 134. The code word/absolute coordinate conversion system 134 derives a run length corresponding to the code word (st203), and derives the absolute coordinate from the line start point for a pixel variation point of the code word (st204) and records it in the line buffer 135 (st205). The absolute coordinate/code word conversion system 136 performs encoding into MH code or MR/MMR code from the variation point coordinate stored in the line buffer 135 (st206) and outputs the code word to the code output circuit 133 (st207). Also, the absolute coordinate/code word conversion system 136 judges whether code conversion is completed or not (st208) so that the foregoing sequence beginning from the code separation (st202) is again initiated when code conversion is not completed. On the other hand, when code conversion is completed, a termination sequence (st209) is performed to terminate the code conversion process.

As another code conversion system, there is a code conversion system disclosed in Japanese Unexamined Patent Publication No. Heisei 1-192271(JP-A-01192271). FIG. 27 is an illustration to be used for discussion of the code conversion system disclosed in the above-identified publication.

In FIG. 27, a data input/output control portion 140 selects a decoding portion depending upon a coding system of input data. An MH encoding/decoding portion 141 performs encoding and decoding of MH code. Also, an MMR encoding/decoding portion 142 performs encoding and decoding of MMR code. An image data buffer 143 stores an image data decoded by the MH encoding/decoding portion 141 or the MMR encoding/decoding portion 142.

In the conventional code conversion system illustrated in FIG. 27, judgement of the coding system is performed by the data input/output control portion 140. For instance, as a result of the judgement of the coding system by the data input/output control portion 140, if the coding type is judged as MH coding type, the MH coded image data is transferred from the data input/output control portion 140 to the MH encoding/decoding portion 141 for performing code conversion from MH code to MMR code. The MH encoding/decoding portion 141 then decodes the MH coded image data. All of the decoded data is temporarily accumulated in the image data buffer 143 as non-coded data. When accumulation of the non-coded data is completed, the MMR encoding/decoding portion 142 loads the non-coded image data accumulated in the image data buffer 143 to perform MMR coding to transfer the MMR coded image data to the data input/output control portion 140.

As shown in the foregoing examples, since the facsimile coding systems, such as MH, MR, MMR coding system or so forth are coding systems based on variation points of a pixel, the conventional code conversion systems could realize code conversion between facsimile codes. However, binary arithmetic encoding/decoding systems represented by arithmetic coding systems defined in CCITT T. 82 are not encoding and decoding systems based on the varying point, but systems performing encoding and decoding by loading a plurality of (e.g. 10 bits of) reference pixels (hereinafter referred to as "template") shown in FIG. 4 of the image data, which is a part of the image data most closely correlated with the objective pixel for encoding and decoding, using a combination of a plurality of (e.g. 10 bits of) values (hereinafter referred to as "context") taken with the template, predicting if the objective pixel for encoding is "1" or "0", calculating the certainty of appearance and comparing the predicted value with the actual value of the objective pixel for encoding, so that the encoding and decoding can be performed with the certainty of appearance on the basis of the result of comparison. Therefore, in order to perform encoding, at least the values of the pixels corresponding to the template and the objective pixel for encoding must be known. Also, in order to perform decoding, the value of the pixels correspond to the template must be known. Therefore, it is impossible to perform code conversion for the binary arithmetic code by the code conversion system employing variation points of the pixel as in the prior art illustrated in FIGS. 25 and 26.

On the other hand, another conventional code conversion system illustrated in FIG. 27, does not employ the variation points of the pixel or run length, but is a code conversion system, in which MH, MR or MMR decoding is performed once for accumulating all of the image data as non-coded data in the buffer, and encoding to the coding system as the final goal is performed subsequently. However, for temporarily accumulating all of the image data, substantial storage capacity becomes necessary for the buffer, which causes a problem.

Furthermore, since encoding to the targeted coding system is finally performed after accumulation of all image to the buffer once, it is not possible to perform decoding and encoding simultaneously in parallel. Therefore, a long time is spent in the code conversion process.

SUMMARY OF THE INVENTION

Therefore, it is an object of the present invention to provide a code conversion system which can solve the problems set forth above.

According to the first aspect of the invention, a code conversion system comprises:

first storage means for storing arithmetically coded image data;

arithmetic decoding means for decoding the arithmetically coded image data stored in the first storage means on the basis of reference pixels for outputting an original image data;

a line buffer memory for storing at least a predetermined number of scanning lines of the original image data output from the arithmetic decoding means;

one dimensional image coding means for receiving the original image data from the line buffer memory, performing one dimensional image coding and outputting one dimensional image coded data; and second storage means for storing the one dimensional image coded data output from the one dimensional image coding means, the arithmetic decoding means reading out the predetermined reference pixels from the line buffer memory, and the predetermined number of scanning lines being the scanning lines including the predetermined reference pixels.

In the preferred construction, the arithmetic decoding means decodes the arithmetically coded image data and then notifies completion of decoding of a predetermined number of image data to the linear image coding means for coding decoded image data in the line buffer memory employing a one dimensional image coding system, using a decoding completion signal, and the one dimensional image coding means notifies completion of coding of a predetermined number of image data to the arithmetic decoding means, using a coding completion signal.

The code conversion system may further comprise run length counting means for receiving decoded image data from the arithmetic decoding means and counting continuously appearing white pixels or black pixels on a common scanning line with respect to a first scanning line including an objective pixel for decoding, and a second scanning line immediately preceding the first scanning line, and two shift registers decoding a value corresponding to the objective pixel for decoding from two lines of run length information including the reference pixels, and sequentially shifting in respective reference pixels relative to two scanning lines, for holding reference pixels necessary for the decoding process of the arithmetic decoding means. Upon performing decoding by the arithmetic decoding means, the arithmetic decoding means selects reference pixel from data in the two shift registers to be used for decoding the objective pixel and shifts a new reference pixel into the LSB of the shift registers each time the arithmetic decoding means decodes an objective pixel. The one dimensional coding means performs coding by inputting run length information associated with the scanning line, including an objective pixel for coding among run length information when the image data is to be coded. Alternately, the code conversion system may further comprise three run length counting means for receiving decoded image data from the arithmetic decoding means and counting continuously appearing white pixels or black pixels on a common scanning line with respect to a first scanning line including an objective pixel for decoding, and second and third scanning lines immediately preceding and two lines preceding the first scanning line, three shift registers decoding a value corresponding to an objective pixel for decoding from three lines of run length information including the reference pixels and sequentially shifting in respective reference pixels relative to three scanning lines, for holding reference pixels necessary for the decoding process of the arithmetic decoding means. Upon performing decoding by the arithmetic decoding means for selecting a reference pixel among three lines, the arithmetic decoding means selects a reference pixel from data in the three shift registers when reference pixels to be used for coding of the objective pixel are included in the three scanning lines with respect to the objective pixel as the object for arithmetic decoding among arithmetically coded image data, and the one dimensional coding means performs coding by inputting run length information associated with the scanning line including an objective pixel for coding among run length information when the image data is to be coded.

Also, the code conversion system may further comprise run length counting means for counting a run length of the original image data output per one pixel from the arithmetic decoding means which decodes arithmetically coded image data, and transmitting the run length to the one dimensional image coding means for coding employing the one dimensional image coding system. The one dimentional image coding means performs coding on the basis of the run length counted by the run length counting means.

According to the second aspect of the invention, a code conversion system comprises first storage means for storing a one dimensional coded image data;

one dimensional image decoding means for reading out the one dimensional coded image data from the first storage means;

a line buffer memory receiving the image data decoded by the one dimensional image decoding means, and storing a predetermined number of scanning lines of the image data, including a pixel to be used as a reference pixel, upon coding according to an arithmetic coding system;

arithmetic coding means for taking a coding objective pixel and a coding reference pixel from the image data in the line buffer memory and performing arithmetic coding; and second storage means for receiving arithmetically coded image data from the arithmetic coding means and storing the same.

In this case, the one dimensional image decoding means decoding the one dimensional coded image data notifies the arithmetic coding means of completion of the decoding of a predetermined amount of image data so that the arithmetic coding means may begin coding the decoded image data in the line buffer memory, using a decoding completion signal, and the arithmetic coding means notifies completion of coding of the predetermined number of image data to the one dimensional image decoding means using a coding completion signal.

The code conversion system may further comprise:

two run length counting means for linearly decoding the one dimensional coded image data and counting a number of continuously appearing white pixels or black pixels on a scanning line with respect to a decoded first scanning line and a second scanning line immediately preceding the first scanning line, two shift registers sequentially decoding values of a reference pixel corresponding to the objective pixel for decoding from the run length information of three scanning lines including the reference pixel and shifting in the reference pixel for holding the reference pixel necessary for the decoding process by the arithmetic decoding means when the arithmetic decoding is performed for selecting a reference image from three lines, the arithmetic decoding means performing arithmetic coding employing the two shift registers holding the reference pixel. Alternately, the code conversion system may further comprise three run length counting means for linearly decoding the one dimensional coded image data and counting a number of continuously appearing white pixels or black pixels on a scanning line with respect to a decoded first scanning line and second and third scanning line located immediately preceding and two line preceding the first scanning line; three shift registers sequentially decoding values of a reference pixel corresponding to the objective pixel for decoding from the run length information of three scanning lines including the reference pixel and shifting in the reference pixel for holding the reference pixel necessary for the decoding process by the arithmetic decoding means when the arithmetic decoding is performed for selecting reference image from three lines, and the arithmetic decoding means performs arithmetic coding employing the three shift registers holding the reference pixel.

BRIEF DESCRIPTION OF THE DRAWINGS

The present invention will be understood more fully from the detailed description given herebelow and from the accompanying drawings of the preferred embodiment of the invention, which, however, should not be taken to be limitative of the present invention, but are for explanation and understanding only.

In the drawings.

DESCRIPTION OF THE PREFERRED EMBODIMENT

First Embodiment

Preferred embodiments of a code conversion system according to the invention will be discussed hereinafter in detail with reference to the accompanying drawings, particularly to FIGS. 1 to 24. In the following description, numerous specific details are set forth in order to provide a thorough understanding of the present invention. It will be obvious, however, to those skilled in the art that the present invention may be practiced without these specific details. In other instances, well-known structures are not shown in detail in order to prevent unnecessary obscuring of the present invention.

Figure 1:
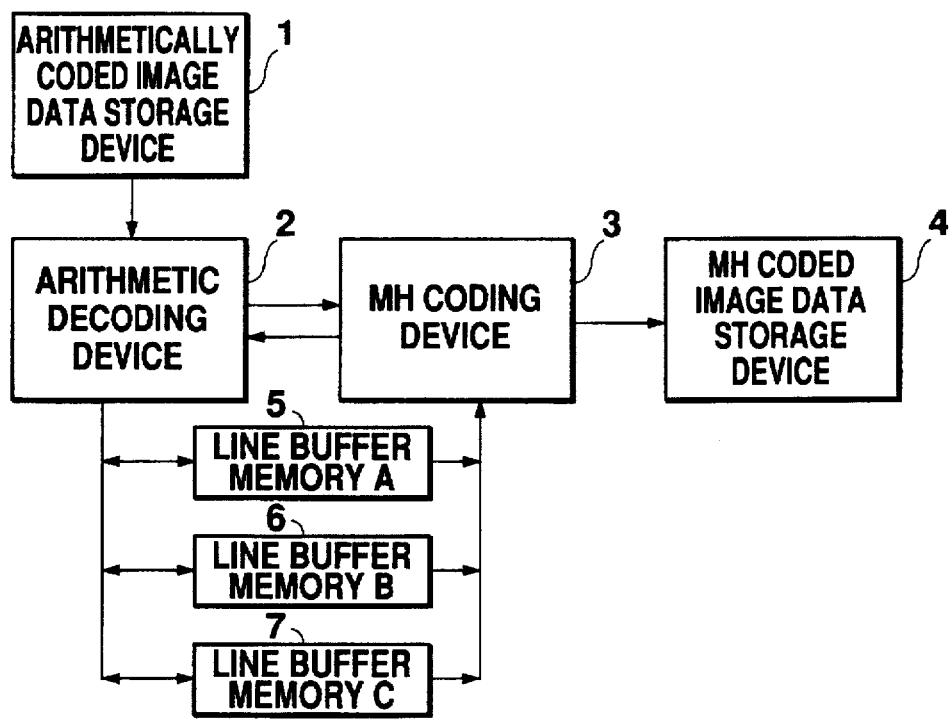
FIG. 1 is an illustration showing a construction of the first embodiment of a code conversion system according to the present invention.

The first embodiment of a code conversion system according to the present invention is illustrated in FIG. 1. The code conversion system of FIG. 1 has a construction adapted to convert a binary arithmetically coded image data which is arithmetically coded by an arithmetic coding system defined by CCITT T. 82 into a MH code as a linear code.

In FIG. 1, an arithmetically coded image data storage device 1 stores arithmetically coded image data. An arithmetic decoding device 2 decodes the arithmetically coded image data stored in the arithmetically coded image data storage device 1 and sets the decoded data in the line buffer memory A5, B6 or C7.

On the other hand, an MH coding device 3 performs MH encoding for the image data decoded by the arithmetic decoding device 2. A MH coded image data storage device 4 stores MH coded image data which is encoded by the MH coding device 3. The line buffer memory A5 is adapted to store one line of non-coded image data. The line buffer memory B6 is alternately used for reading and writing together with one of the line buffer memory A5 or the line buffer memory C7. The line buffer memory C7 is also used alternately for reading and writing together with the line buffer memory A5 or line buffer memory B6.

Figure 3:
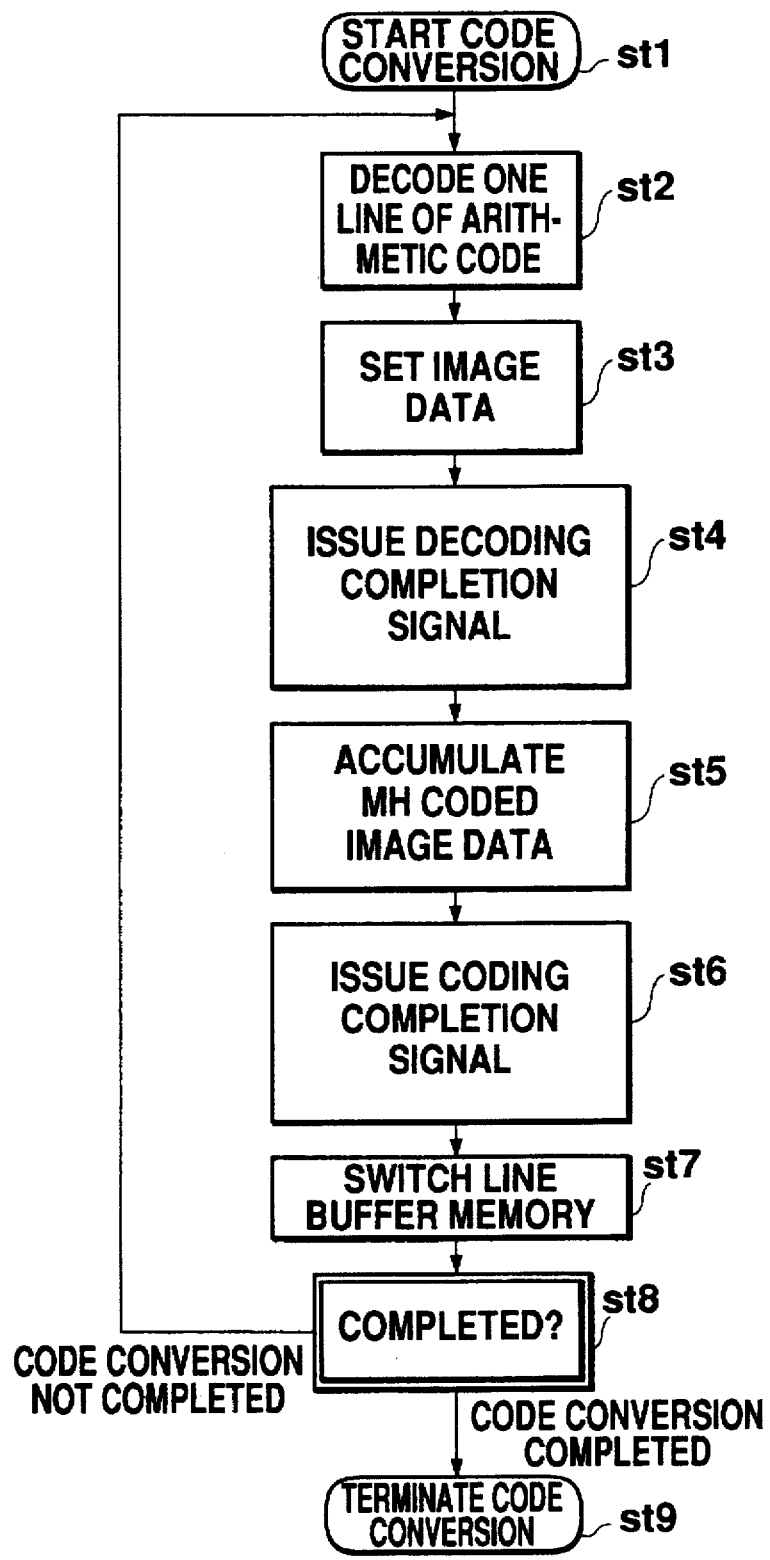
FIG. 3 is a flowchart showing an operation of the first embodiment of the code conversion system of the invention.
Figure 4:
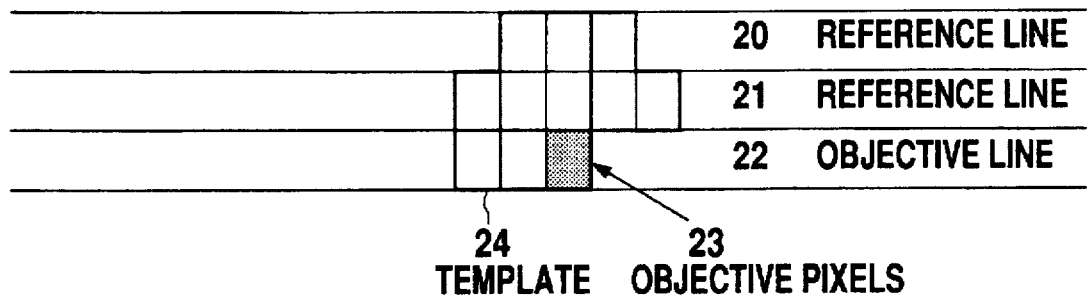
FIG. 4 is an illustration showing a manner of assignment of a three line reference template and a line buffer memory in an arithmetic decoding system.

The operation of the first embodiment of the code conversion system according to the present invention will be discussed with reference to FIG. 3 illustrating a procedure of a code conversion process.

Initially, an objective line for code conversion is decoded by the arithmetic decoding device 2 (st2). Then, the image data of the objective line 32 for code conversion shown in FIG. 5(a) is set in the line buffer memory C7 (st3).

Subsequently, the fact that the image data of the objective line 32 for code conversion is set in the line buffer memory C7 by the arithmetic decoding device 2, is notified to the MH coding device 3 by supplying a decoding completion signal (st4).

Then, the MH coding device 3 receiving the decoding stored in the line buffer memory C7 and containing the image data of the objective line 32 for code conversion. The coded data is then stored in the MH coded image data storage device 4 (st5).

Thereafter, the MH coding device 3 issues a coding completion signal to notify the arithmetic decoding device 2 that MH coding has been completed (st6).

Figure 5:
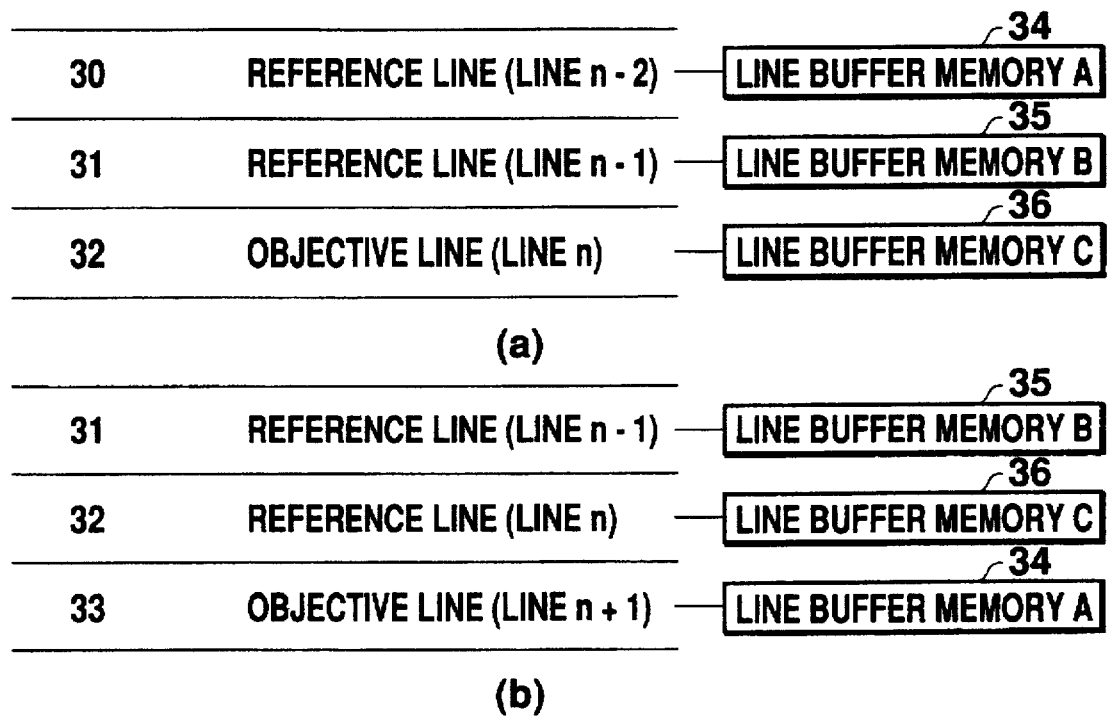
FIG. 5 is an illustration showing a process of assignment of a line buffer of the code conversion system of the first and second embodiments of the invention.

Subsequently, as shown in FIG. 5, the line buffer is switched so that the next objective line (line n+1) 33 for code conversion is set in a line buffer memory A34 which stores pixels on a reference line (line n-2) 30 (st7).

On the other hand, the line buffer memory B35 storing the pixels on the reference line (line n-1) 31 and the line buffer memory C36 storing the pixels of the objective line (line n) 32 for coding, already store pixels on the lines necessary for next code conversion. Therefore, data stored in these line buffer memories B35 and C36 are not updated.

Subsequently, judgement is made as to whether the code conversion process is progressed for a predetermined number of lines (st8). If not completed, the process from the arithmetic decoding process of the objective line for code conversion is repeated. On the other hand, if completed, the code conversion process is terminated (st9).

Second Embodiment

Figure 2:
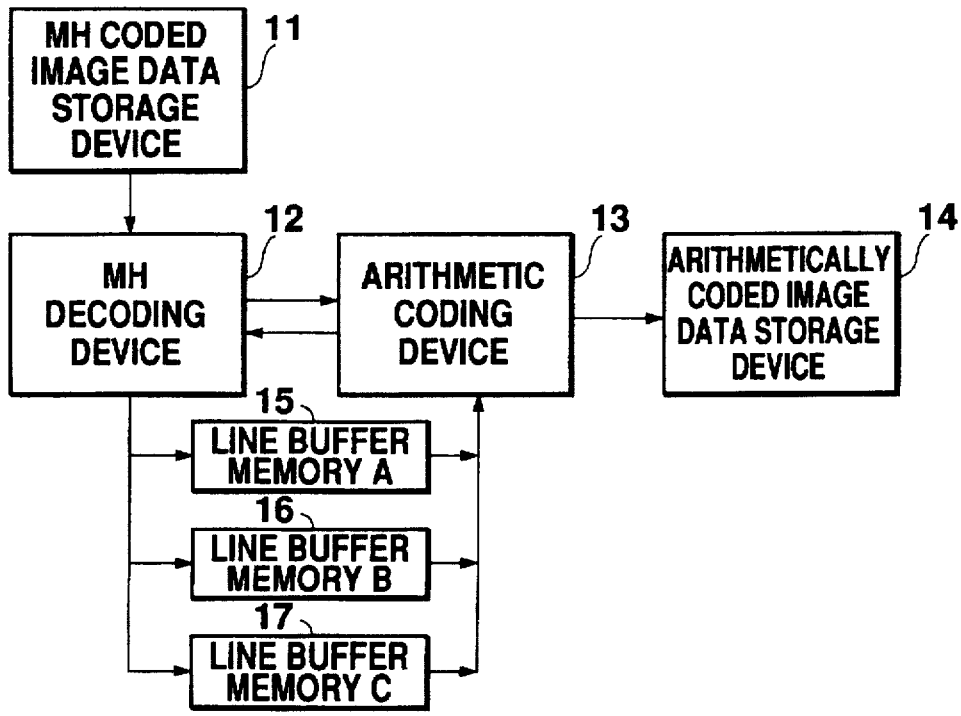
FIG. 2 is an illustration showing a construction of the second embodiment of code conversion system according to the invention.

The construction of the second embodiment of the code conversion system according to the invention is illustrated in FIG. 2. The second embodiment of the code conversion system of FIG. 2 is adapted to convert the MH coded image data which is coded by the MH coding system defined by CCITT T. 4 into binary arithmetically coded image data coded by an arithmetic coding system defined by CCITT T. 82.

In FIG. 2, an MH coded image data storage device 11 stores MH coded image data. An MH decoding device 12 decodes pixel data on the objective line for code conversion using the MH coded image data stored in the MH coded image data storage device 11. The decoded image data on the objective line for code conversion is set in a line buffer memory A15, B16 or C17.

On the other hand, an arithmetic coding device 13 performs arithmetic coding for the objective line for code conversion and stores the arithmetically coded image data in an arithmetically coded image data storage device 14.

The line buffer memory A15 is adapted to store one line of non-coded image data. The line buffer memory B16 is alternately used for reading and writing together with one of the line buffer memory A15 or the line buffer memory C17. The line buffer memory C17 is also used alternately for reading and writing together with the line buffer memory A15 or line buffer memory B76.

Figure 6:
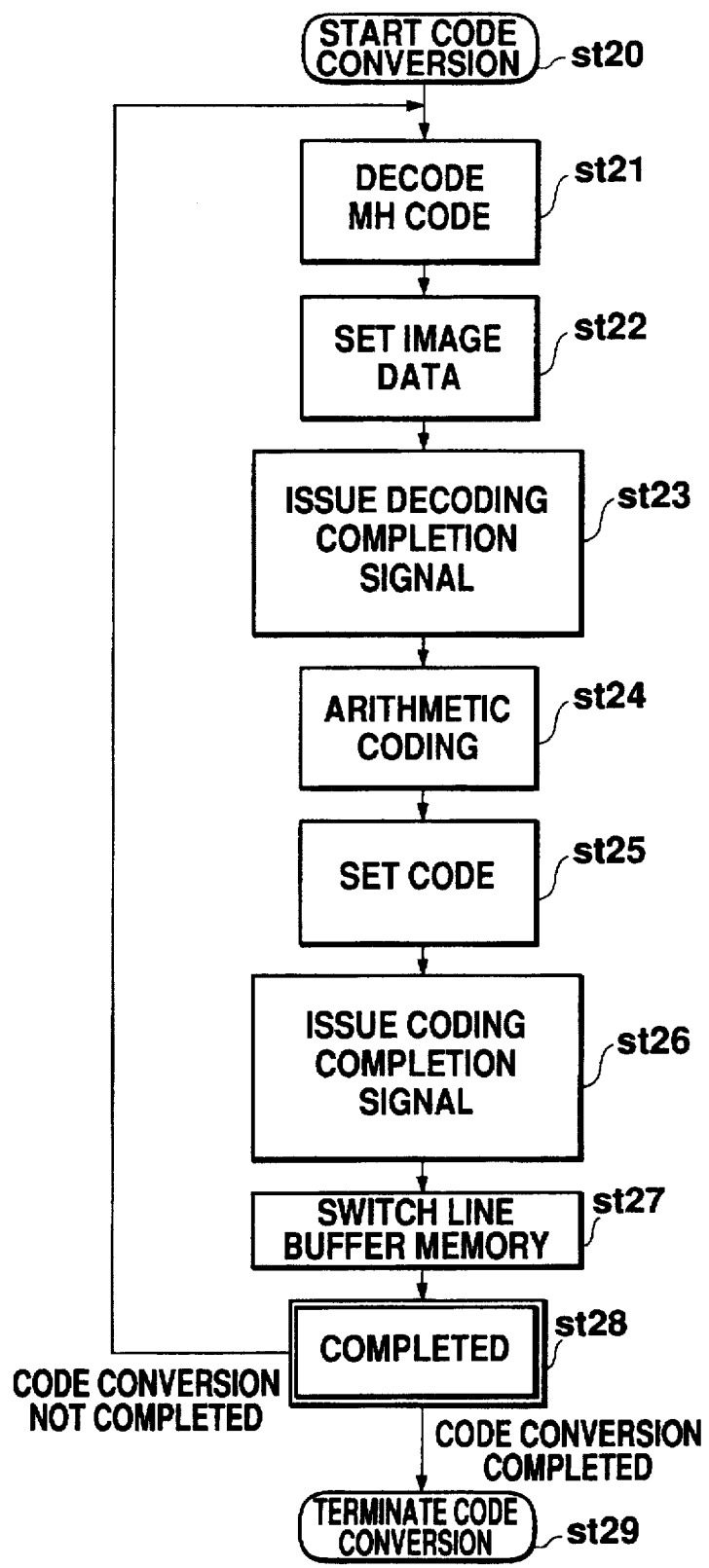
FIG. 6 is a flow chart showing operation of the second embodiment of the code conversion system according to the invention.

The operation of the second embodiment of the code conversion system according to the present invention will be discussed with reference to FIG. 6 illustrating a procedure of a code conversion process.

Initially, MH code on an objective line for code conversion is decoded by the MH code decoding device 12 (st21). Then, the decoded image data of the objective line 32 for code conversion shown in FIG. 5(a) is set in line buffer memory C17 (st22).

Subsequently, a decoding completion signal is sent by the MH decoding device to the arithmetic coding device to notify the arithmetic coding device that the decoded image data of the objective line 32 for code conversion is set in the line buffer memory Then, the arithmetic coding device 13 receiving the decoding completion signal performs arithmetic coding for the image data of the objective line for code conversion (st24). The coded data is then stored in the arithmetically coded image data storage device 14 (st25).

Thereafter, the arithmetic coding device 13 issues a coding completion signal to notify the MH decoding device 12 of completion of arithmetic coding (st26).

Subsequently, in order to use the current objective line for coding as a reference line, as shown in FIG. 5, the line buffer memory A34, B35 and C36 are switched in a similar manner to the foregoing first embodiment (st27).

Thereafter, judgement is made as to whether the code conversion process is progressed for a predetermined number of lines (st28). If not completed, the MH decoding process of the objective line for code conversion is repeated. On the other hand, if completed, the code conversion process is terminated (st29).

Third Embodiment

Figure 7:
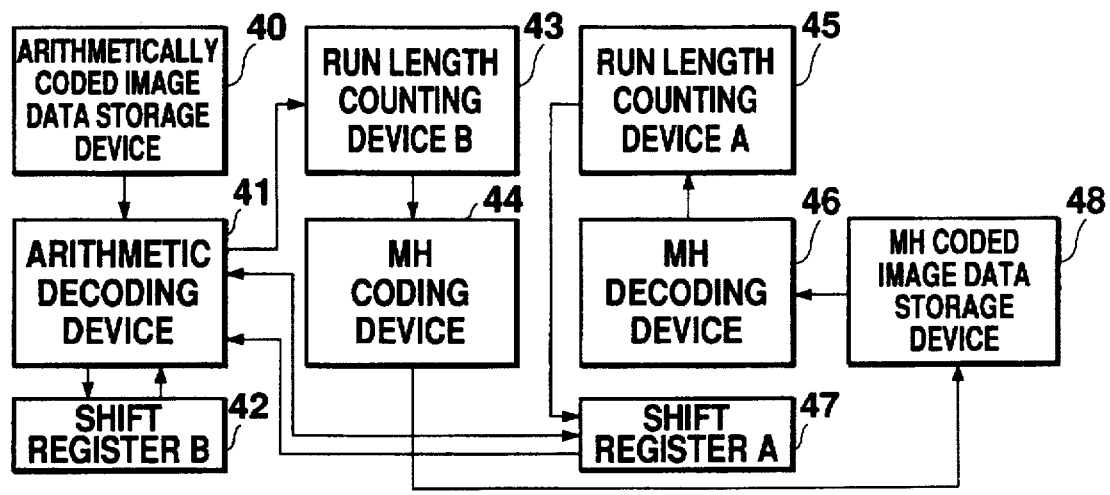
FIG. 7 is an illustration showing the third embodiment of the code conversion system of the invention.
Figure 8:
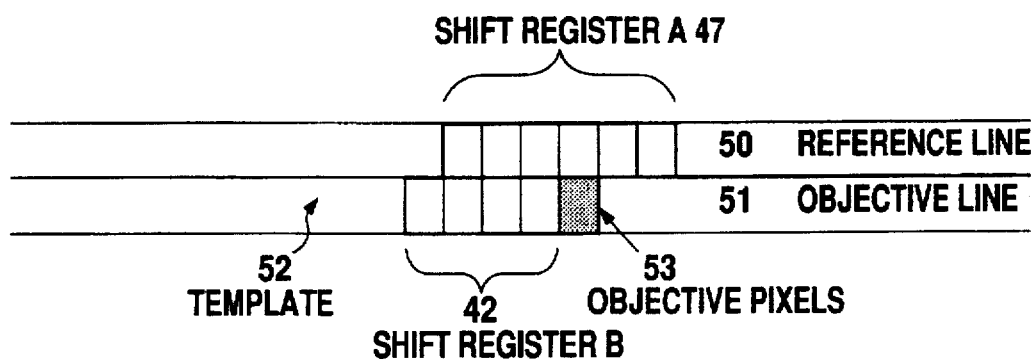
FIG. 8 is an illustration showing assignment of a two line reference template and the shift register in arithmetic coding system.
Figure 8:
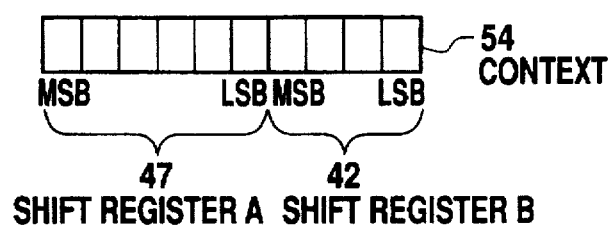

The third embodiment of the code conversion system according to the present invention will be discussed hereinafter with reference to FIGS. 7 and 8. FIG. 7 illustrates a construction of a device for converting binary arithmetically coded image data into MH coded image data. FIG. 8 shows a template for two line reference arithmetic coding and a context obtained by the template.

In FIG. 7, an arithmetically coded image data storage device 40 stores arithmetically coded image data. An arithmetic decoding device 41 loads the arithmetically coded image data stored in the arithmetically coded image data storage device 40 to decode for each pixel and sets it in a shift register B42.

On the other hand, the shift register B42 stores the image data of the template of the objective line for coding, corresponding to the shift register B42. The image data stored in the shift register B42 is shifted by one bit whenever one pixel in the image data is decoded by the arithmetic decoding device 41. A run length counting device 43 receives image data decoded by the arithmetic decoding device 41 for each pixel and counts run length of continuous white pixels or black pixels.

The MH coding device 44 receives the counted run length from the run length counting device B43 to convert the run length into an MH code word. A run length counting device A45 receives the run length of one code word of the MH coded image data of the template corresponding to a shift register A47 among MH coded image data already MH coded, from an MH decoding device 46, and counts the same.

The MH decoding device 46 converts the MH code word into the run length by performing MH decoding with respect to one code of the MH code word if the template corresponds to the shift register A47 of the reference line. Then, the MH decoding device 46 feeds the run length of the MH code into a run length counting device A45. The shift register A47 stores the image data of the template of the reference line corresponding to the shift register A and shifts the image data by one bit whenever one pixel of image data is decoded by the arithmetic decoding device 41.

An MH coded image data storage device 48 receives the MH code word from the MH coding device 44 and stores the MH coded image data.

Figure 10:
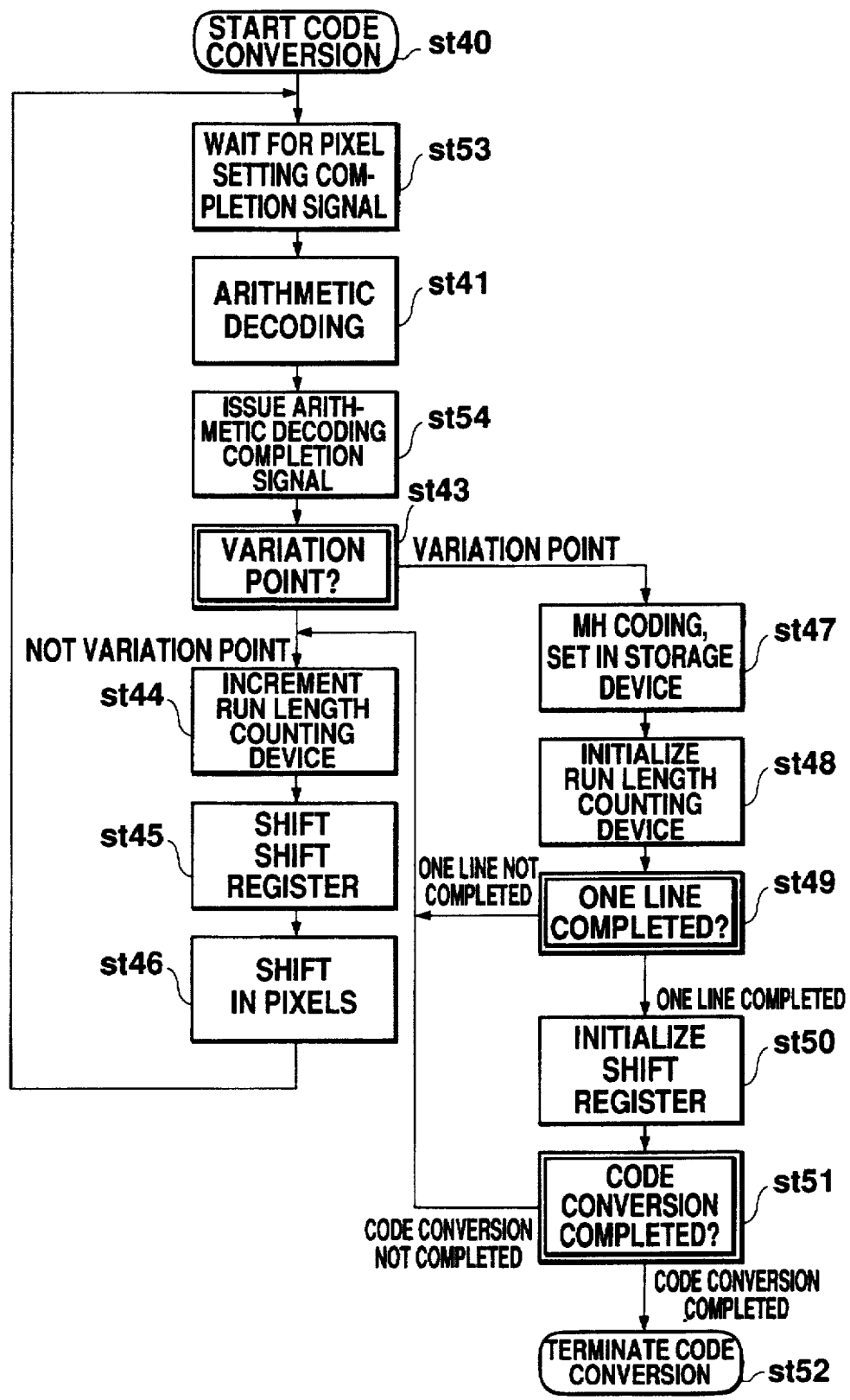
FIG. 10 is a flowchart showing an operation of the third embodiment of the code conversion system according to the invention.
Figure 11:
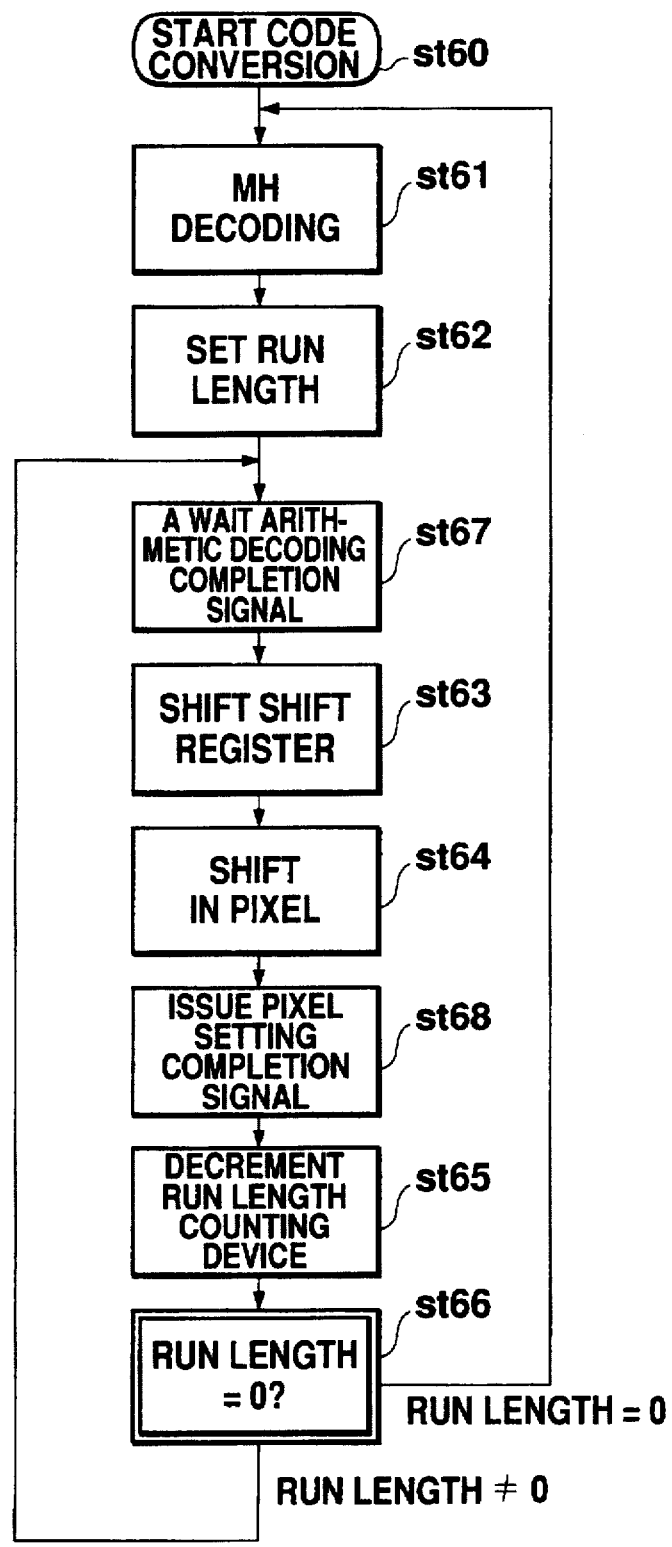
FIG. 11 is also a flowchart showing an operation of the third embodiment of the code conversion system according to the invention.

Operation of the shown embodiment of the code conversion system will be discussed with respect to the procedure of the code conversion process as illustrated in FIGS. 10 and 11.

FIG. 10 is an illustration showing a procedure of process for the objective line for code conversion to be performed by the device for converting the binary arithmetically coded image data code into the MH coded image data.

At first, initialization of the device is performed (st40). The arithmetic decoding device 41 waits for a pixel setting completion signal, from the shift register A47, which indicates that the setting of a pixel of the template in the shift register has been completed. The shift register A47 stores the template on the reference line 50 necessary for arithmetic decoding of the arithmetically coded image data by the arithmetic decoding device 41.

The arithmetic decoding device 41 is responsive to the pixel setting completion signal from the shift register A47 to perform arithmetic decoding of the arithmetically coded image data (st41) to output one pixel.

Next, when the arithmetic decoding process for one pixel set forth above is completed, the arithmetic decoding device 41 outputs an arithmetic decoding completion signal to the shift register A47 (st54). The shift register A47 is responsive to the arithmetic decoding completion signal to initiate a process for setting the next pixel, as shown in FIG. 11.

Then, one pixel output by the run length counting device B43 is compared with the value of the immediately preceding pixel (st43). At this time, when the value of the output pixel is not varied from the immediately preceding pixel value, the process is branched to st44, and when the value of the output pixel is varied, judgement is made that the currently output pixel is the variation point and thus the process is branched to st47.

When the value of the arithmetically decoded pixel is not varied, the run length counting device B43 is incremented (st44) to update the run length information. Subsequently, the shift register B42 is shifted to the left by one bit (st45). Then, in the least significant bit (LSB) of the shift register B42, the value of one bit corresponding to one pixel decoded by the arithmetic decoding device 41 at st41 is shifted in (st46). The process is then continued.

On the other hand, when the pixel value is varied, with reference to the value of the run length counting device B43, MH coding by the MH coding device 44 is performed on the basis of the obtained run length to store the MH code to the MH coded image data storage device 48 (st47). Subsequently, the run length counting device B43 is initialized (st48). Then, a check is performed as to whether the MH coding process in the MH coding device 44 is for the last pixel of the objective line for code conversion currently processed or not (st49). If the current MH coding process is not for the last pixel of the objective line, the process subsequent to st44 is executed.

On the other hand, when the currently processed pixel is the last pixel of the objective line, the contents of the shift register A47 and the shift register B42 are initialized (st50). Then, a check is performed as to whether the code conversion for the predetermined number of lines is completed or not (st51). If not completed, the process from st44 is executed, and if completed, the code conversion process is terminated (st52).

Next, the operation of the shift register A47 will be discussed, with reference to the reference line together with the procedure of the process illustrated in FIG. 11, in conjunction with the operation shown in FIG. 10.

As shown in FIG. 11, when the code conversion system is initially initialized (st60), one code word of the MH code in a reference line 50, which is one preceding line of the objective line to be subject to code conversion stored in the MH coded image data storage device 48, is decoded by the MH decoding device 46 (st61). Then, the obtained run length is set in the run length counting device A45 (st62).

Subsequently, in order to hold setting of the next pixel until the arithmetic decoding process by the arithmetic decoding device 41 is completed, the shift register A47 waits for the decoding completion signal from the arithmetic decoding device 41 (st6? ).

Then, when the arithmetic decoding completion signal is supplied from the arithmetic decoding device 41, the shift register A47 shifts data toward the left for one bit (st63). Then, one bit value corresponding to the value of the pixel of run length decoded by the MH decoding process (st61) of the MH decoding device 46 is shifted in the LSB bit of the shift register A47 (st64).

Next, the shift register A47 storing the template at the reference line 50, feeds a pixel setting completion signal indicative of completion of the setting of the pixel of the template to the arithmetic decoding device 41 (st68).

Subsequently, the run length counting device A45 decrements the counted value (st65). Then, a check is performed to see if the value of the run length counting device A45 becomes zero as a result of the decrementing process (st65) of the run length counting device A45 (st66).

As a result of judgement, when the run length counting device A45 is not zero, the process from st67 is again executed. On the other hand, when the run length counting device A45 is zero, a process from the MH decoding process (st61) in the MH decoding device 46 is executed to update the run length counting device A45 and the value of the pixel.

Fourth Embodiment

Figure 9:
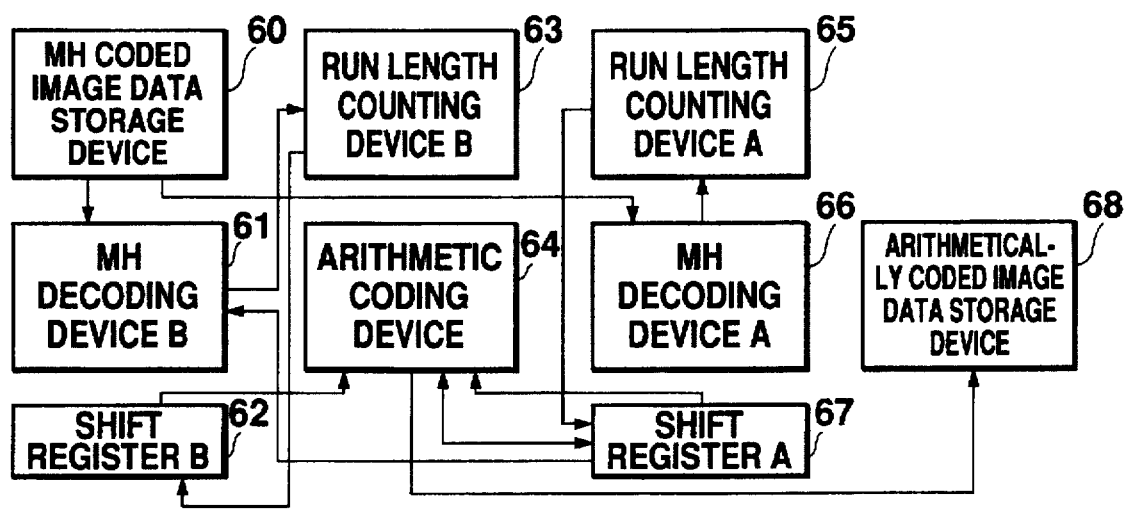
FIG. 9 is an illustration showing the fourth embodiment of the code conversion system according to the invention.

The fourth embodiment of the code conversion system according to the present invention is illustrated in FIGS. 9 and 8. FIG. 9 illustrates the construction of the system for converting the MH coded image data into the binary arithmetically coded image data code.

In FIG. 9, an MH coded image data storage device 60 stores the MH coded image data. A MH decoding device B61 loads the MH coded image data stored in the MH coded image data storage device 60 to feed a run length, obtained by MH decoding of one code word of the MH code in the objective line for code conversion, to the run length counting device B63.

On the other hand, the shift register B62 stores the image data of the template of the objective line 51 for coding, corresponding to the shift register B42. The image data stored in the shift register B62 is shifted by one bit whenever one pixel in the image data is coded by the arithmetic coding device 64. A run length counting device B63 receives the run length of one code word from the MH decoding device 61, counts the run length and outputs each pixel to the shift register B62 every time one pixel is subjected to arithmetic coding.

The arithmetic coding device 64 performs arithmetic coding of the objective pixel 53 for coding employing a template formed from the shift register A47 and the shift register B42, as shown in FIG. 8. The arithmetic code thus coded is stored in the arithmetically coded image data storage device 68. The run length counting device A65 receives the run length of one code word decoded by the MH decoding apparatus A66 from the MH decoding device A66, counts the run length and outputs to the shift register A67 for one pixel at every occurrence of arithmetic coding of one pixel.

The MH decoding device 66 loads the MH coded image data stored in the MH coded image data storage device and performs MH decoding for one code word of the MH code of the template of the reference line corresponding to the shift register A47 to transfer the run length of the MH code to the run length counting device A65. The shift register A67 stores the image data corresponding to the template 52 of the reference line 50 and shifts one bit at every occurrence of coding for one pixel of the object pixels 53 for coding by the arithmetic coding device 64.

The arithmetically coded image data storage device 63 receives the arithmetic code coded by the arithmetic coding device 64 from the arithmetic coding device 64 and thus stores the arithmetically coded image data.

Figure 12:
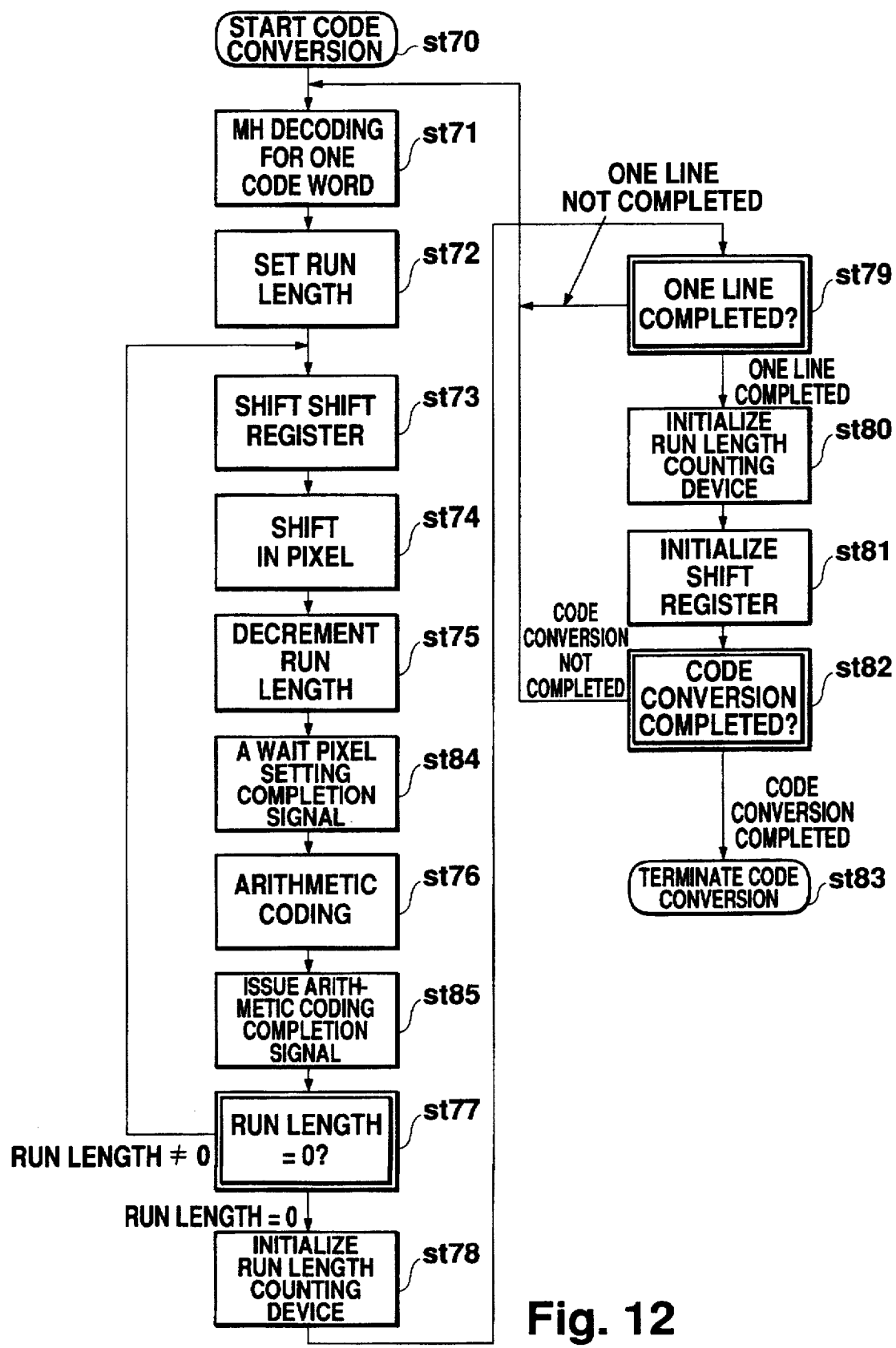
FIG. 12 is a flowchart showing an operation of the fourth embodiment of the code conversion system according to the invention.

The operation will be discussed employing the processing procedure illustrated in FIG. 12. FIG. 12 is an illustration of the processing procedure for the objective line for coding of the device for converting the MH coded image data into the binary arithmetically coded image data code.

At first, initialization of the device is performed (st70). One code word of the MH coded image data stored in the MH coded image data storage device 60 is decoded by the MH decoding device B61 to output the run length corresponding to one code word (st71). In the foregoing process, the run length of one code word output from the MH decoding device B61 is set in the run length counting device B63 (st72).

Next, the shift register B62 shifts the registered data toward the left by one bit (st73). Then, for the LSB bit of the shift register B62, one bit value corresponding to the pixel of the run length obtained through the MH decoding process is shifted in (st74).

Next, the run length counting device B63 is decremented (st75). As a result of this, the pixel setting process for the shift register B62 with respect to the template is completed.

Next, the arithmetic coding device 64 waits for the pixel setting completion signal from the shift register A67 which stores the template 52 of the reference line 50 (St84). This pixel setting completion signal indicates that the necessary pixel setting for arithmetic coding process into the shift register A67 is completed.

Then, the arithmetic coding device 64 is responsive to the pixel setting completion signal to perform arithmetic coding by taking the template 52 formed by the shift register A67 and the shift register B62 as shown in FIG. 9, as context 54 (st 76). The arithmetic code output at this time is stored in the arithmetically coded image data storage device 68.

After completion of the arithmetic coding process, the arithmetic coding device 64 issues an arithmetic coding completion signal to the shift register A67 (st85). The shift register A67 thus initiates a process for setting of the next pixel (within the shift register A67) shown in FIG. 13 to the shift register A67.

Next, judgement is made as to whether the run length of the run length counting device B63 decremented through the foregoing process is zero or not (st77). When the judged result is that the run length stored in the run length counting device B63 is not zero, the process from st73 is repeated.

On the other hand, when judgement is made that the run length is zero, one code word of the MH code is decoded in the MH decoding device B61. In order to load the decoded data in the shift register 62, the run length counting device B63 is initialized (st78).

Thereafter, an objective pixel for coding currently converted through the code conversion process set forth above is judged to see whether or not the current objective pixel is the last pixel of the objective line 61 for code conversion stored in the MH coded image data storage device (st79). If the currently processed objective line 51 for code conversion is not the last pixel, the process from st71 is repeatedly executed. On the other hand, if the currently processed pixel is the last pixel, as preparation for the code conversion of the next line among the objective lines for code conversion, the run length counting device A65 is initialized (st80), and the shift register A57 and the shift register B62 are initialized (st81). Subsequently, judgement is made as to whether or not the line currently completed in the code conversion process is the last line of the image data stored in the MH coded image data storage device 60 to perform code conversion process (st82). If the code conversion is completed, the code conversion termination process is performed (st83), and otherwise, the foregoing process from st71 is repeated.

Figure 13:
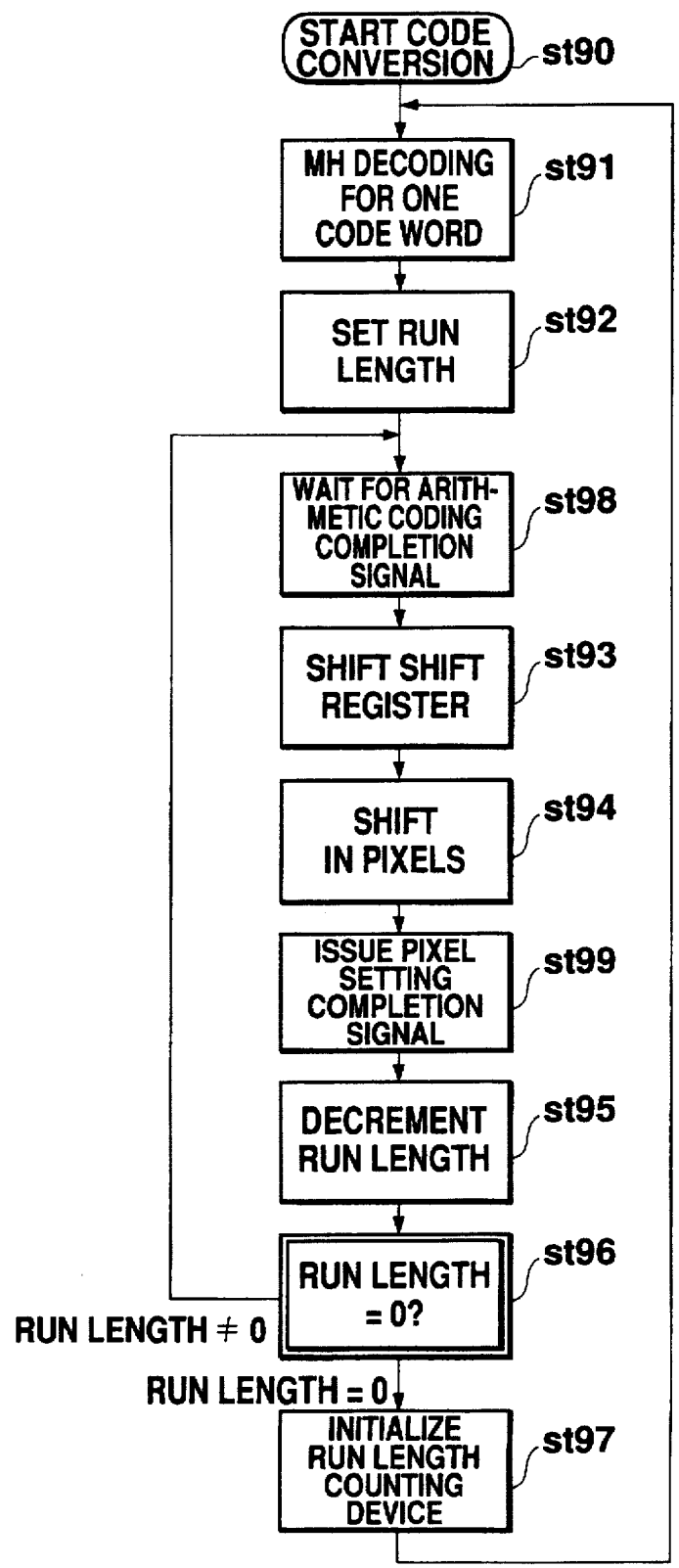
FIG. 13 is also a flowchart showing an operation of the fourth embodiment of the code conversion system according to the invention.

The operation of the shift register A67 making reference to the reference line will be discussed, together with the operation of the process in the processing procedure illustration in FIG. 13, as well as the operation for the process shown in FIG. 12.

When the code conversion is initiated (st90), one code word of the MH coded image data of the reference line in the template necessary for the arithmetic coding process is MH decoded by the MH decoding device A66 to output the run length corresponding to the one code word (st91). The run length of one code word of the MH code thus obtained is set in the run length counting device A62 (st 92).

Next, for holding setting of the next pixel to the shift register A67 until the arithmetic coding device 64 completes arithmetic coding process, the shift register A67 waits for the arithmetic coding completion signal input from the arithmetic coding device (st 98).

When the arithmetic coding completion signal is fed from the arithmetic coding device 64, the shift register A67 shifts the data toward the left by one bit (st93). To the LSB bit of the shift register, the one bit value corresponding to the pixel of the run length obtained through the MH decoding process (st91) is shifted in (st94).

Next, the pixel setting completion signal is fed to the arithmetic coding device 64 (st99). The image setting completion signal represents that the process for setting the pixel of the template to the shift register A67, which stores the template in the reference line, is completed.

Subsequently, the run length counting device A65 is decremented (st95). Then, a check is performed as to whether the run length stored in the run length counting device A65 is zero or not (st96). When the result of checking indicates that the run length stored in the run length counting device A65 is not zero, the foregoing process from st98 is repeated.

On the other hand, if the run length stored in the run length counting device A65 is zero, the run length counting device A65 is initialized for decoding one code word of the MH code in the reference line 50 of the shift register A67 corresponding to the next template 52 and loading in the shift register A67 (st97).

Fifth Embodiment

Figure 14:
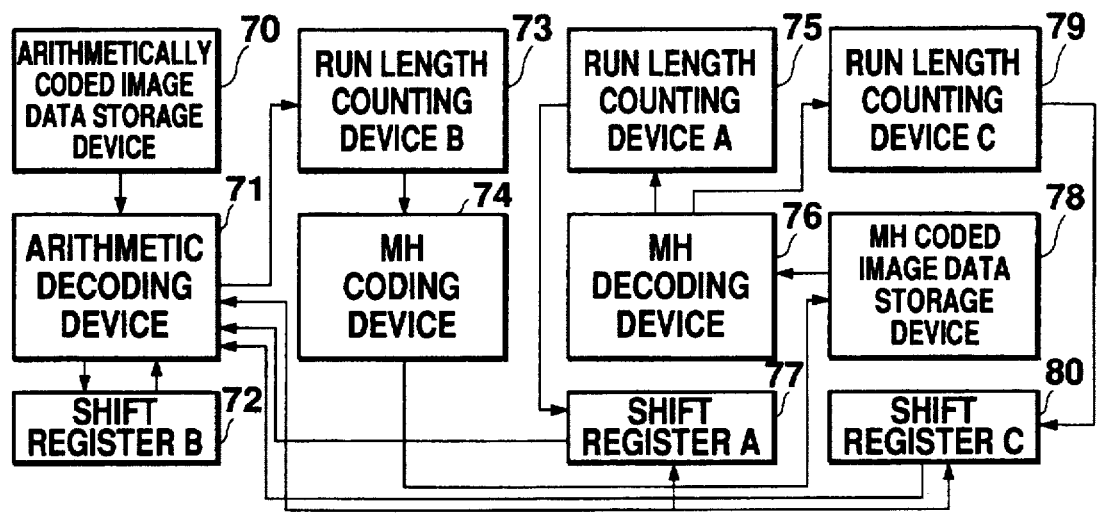
FIG. 14 is an illustration showing a construction of the fifth embodiment of the code conversion system according to the invention.
Figure 15:
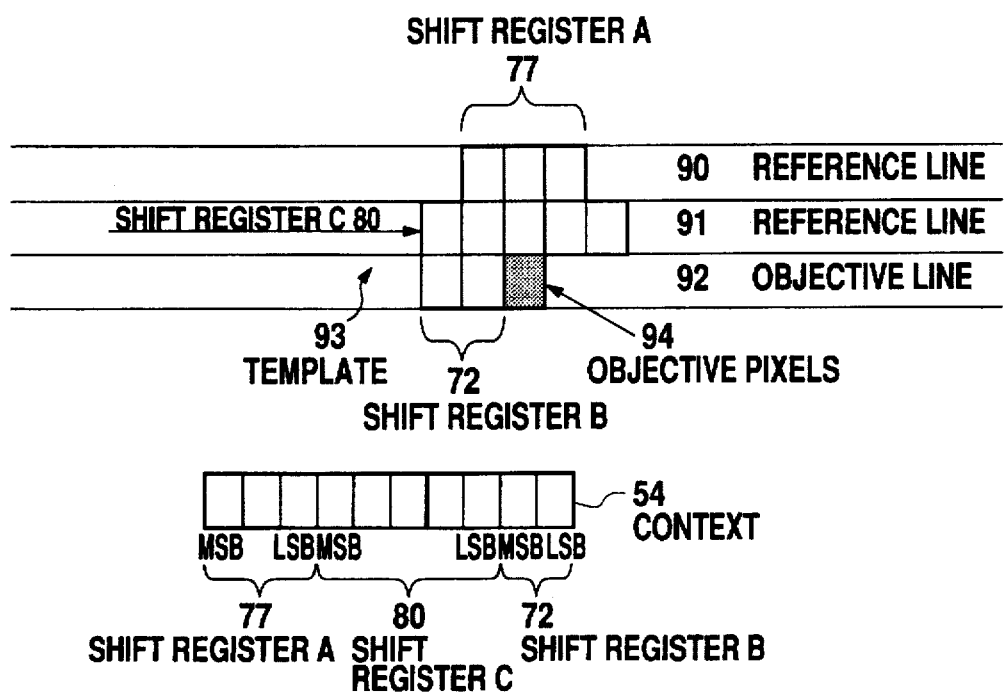
FIG. 15 is an illustration showing a manner of assignment of a three line reference template and a shift register in the arithmetic coding system.

The fifth embodiment of the code conversion system according to the present invention is illustrated in FIGS. 14 and 15. FIG. 14 shows a construction of the system for converting binary arithmetically coded image data code into the MH coded image data. FIG. 15 is an explanatory illustration showing a template for three line reference arithmetic coding and a context obtained from the template.

In FIG. 14, an arithmetically coded image data storage device 70 stores an arithmetically coded image data. An arithmetic decoding device 71 loads the arithmetically coded image data stored in the arithmetically coded image data storage device 70 to decode for each pixel and set it in a shift register B72.

A run length counting device B73 receives image data decoded by the arithmetic decoding device 71 for each pixel to count a run length of continuous white pixels or black pixels. The MH coding device 74 receives the counted run length from the run length counting device B73 to convert the run length into an MH code word.

A run length counting device A75 receives a run length of one code word of the MH coded image data of the template corresponding to a shift register A among MH coded image data already MH coded, from a MH decoding device 76, and counts the same. The MH decoding device 76 converts the MH code word into the run length by performing MH decoding with respect to an MH code word if the template corresponding to the shift register A77 of the reference line. Then, the MH decoding device 76 feeds the run length of the MH code to a run length counting device A75.

A shift register A77 stores the image data of the template of the reference line corresponding to the shift register A and shifts the image data for one bit whenever one pixel of image data is decoded by the arithmetic decoding device 71, as shown in FIG. 15. A MH coded image data storage device 78 receives the MH code word from the MH coding device 74 and stores the MH coded image data. A run length counting device C79 receives a run length of one code word of the MH coded image data of the template corresponding to a shift register A among MH coded image data already MH coded, from an MH decoding device 76 and counts the same.

A shift register C80 stores image data of a template corresponding to the shift register C80 of the reference line, shown in FIG. 15. The shift register C80 shifts the data by one bit every time one pixel is decoded in the arithmetic decoding device 71.

Figure 17:
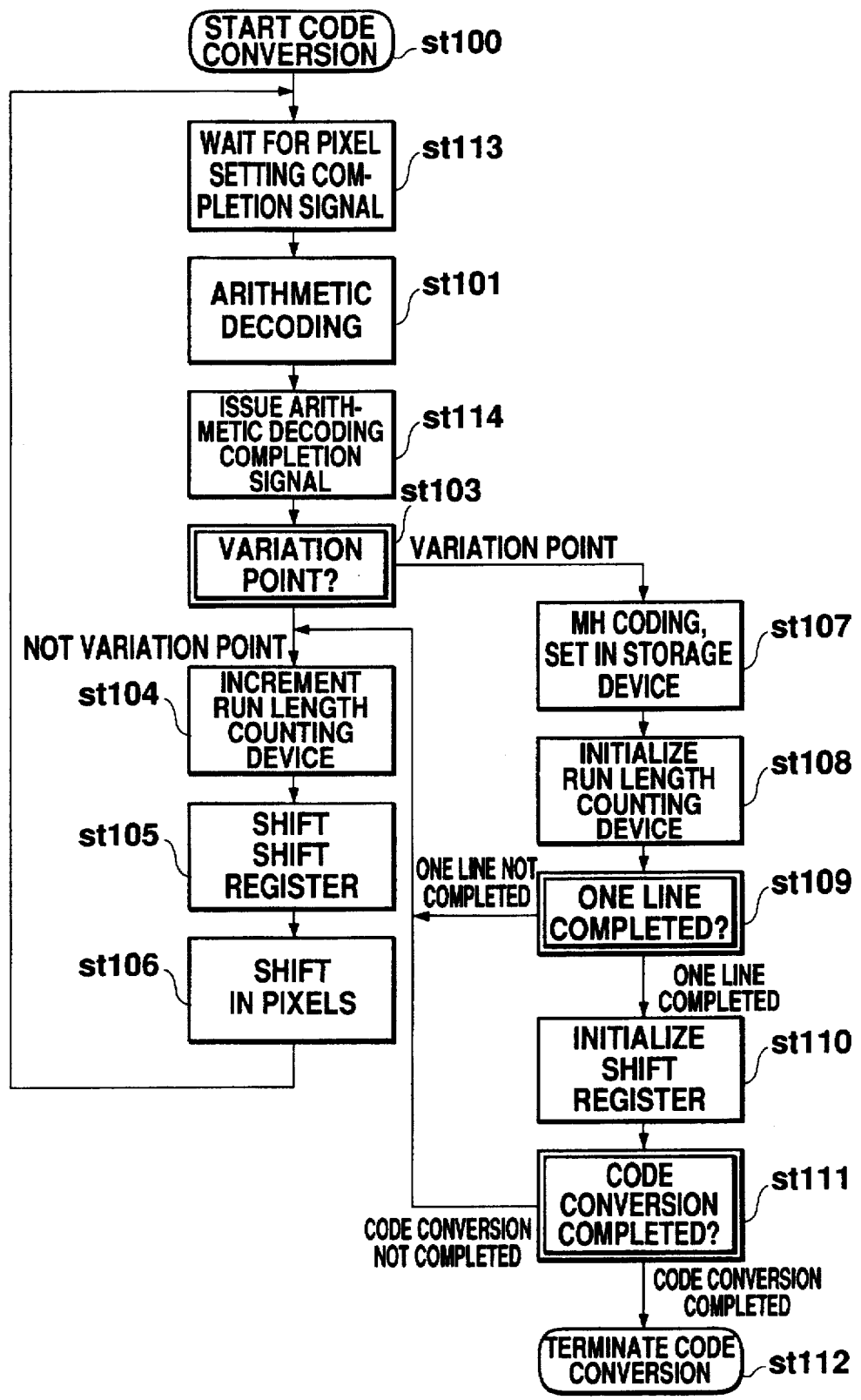
FIG. 17 is also a flowchart showing an operation of the fifth embodiment of the code conversion system according to the invention.
Figure 18:
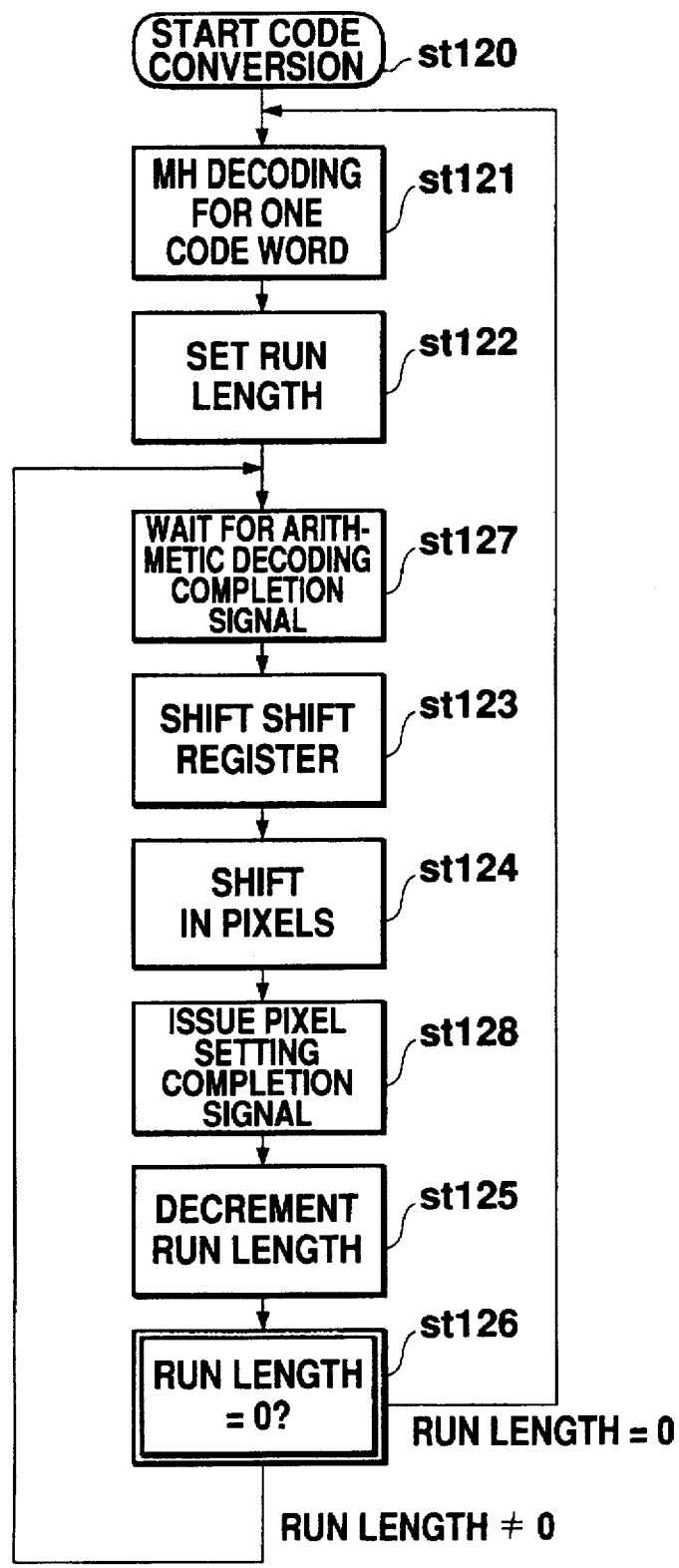
FIG. 18 is also a flowchart showing an operation of the fifth embodiment of the code conversion system according to the invention.
Figure 19:
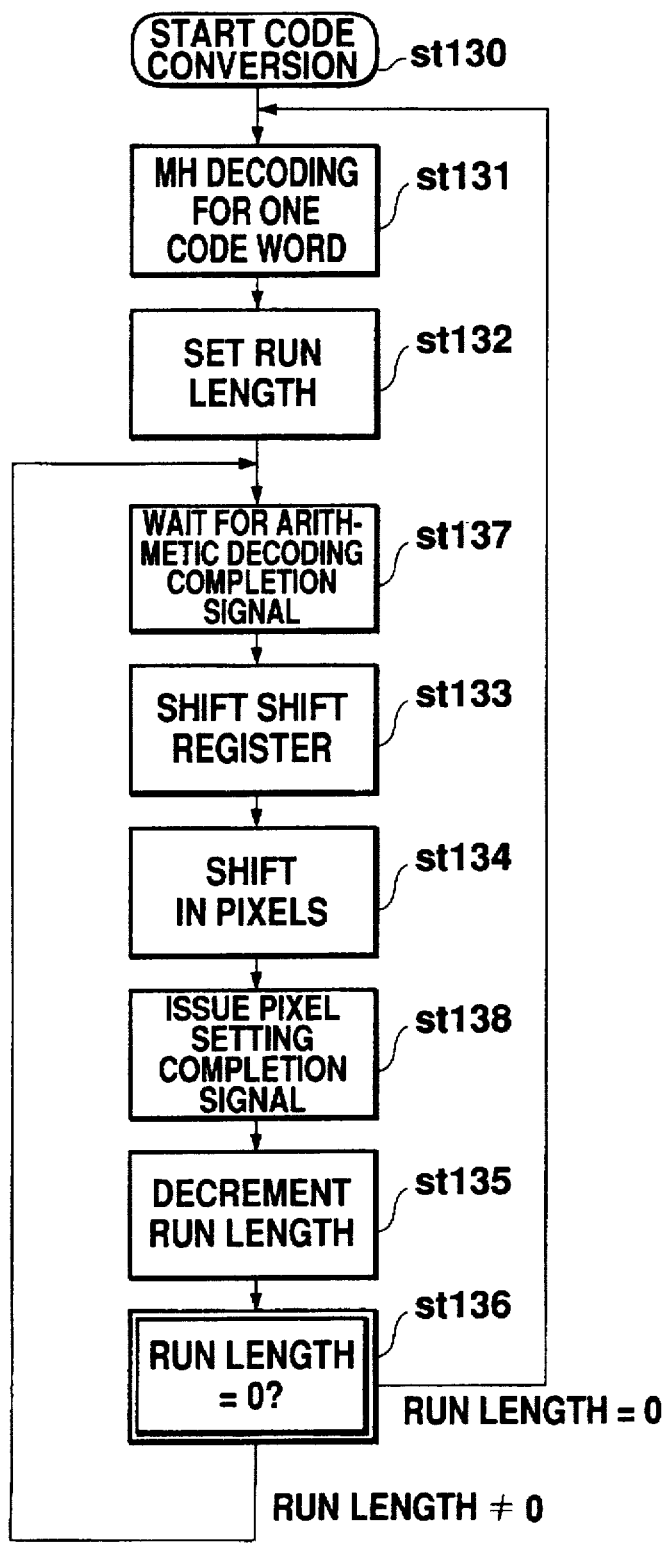
FIG. 19 is also a flowchart showing an operation of the fifth embodiment of the code conversion system according to the invention.

Operation of the shown embodiment of the code conversion system will be discussed with respect to the procedure of the code conversion process as illustrated in FIGS. 17, 18 and 19.

FIG. 17 is an illustration showing a procedure of a process for code conversion of the objective line to be performed by the device for converting the binary arithmetically coded image data code into the MH coded image data.

At first, discussion will be given for the operation of the shift register B72 with reference to the objective line for code conversion.

Initialization of the device is performed (st100). The arithmetic decoding device 71 waits for a pixel setting completion signal from both the shift register A77 and the shift register C80 (st113).

The shift register A77 stores the template on the reference line 90 necessary for arithmetic decoding of the arithmetically coded image data by the arithmetic decoding device 71. The shift register A77 outputs the pixel setting completion signal indicative of completion when setting of pixel of the template is completed in the shift register C80.

The arithmetic decoding device 71 is responsive to the pixel setting completion signals from the shift register A77 and the shift register C80 to perform arithmetic decoding of the arithmetically coded image data (st101) to output one pixel.

Next, when an arithmetic decoding process for one pixel as described above is completed, the arithmetic decoding device 71 outputs an arithmetic decoding completion signal to the shift register A77 and the shift register C80 (st114). The shift register A77 is responsive to the arithmetic decoding completion signal to initiate a process for setting the next pixel, as shown in FIG. 18. The shift register C80 initiates the process for setting the next pixel shown in FIG. 19.

Then, one pixel output by the run length counting device B73 is compared with the value of the immediately preceding pixel (st103). At this time, when the value of the output pixel is not varied from the immediately preceding pixel value, the process is branched to st104, and when the value of the output pixel is varied, judgement is made that the currently output pixel is the variation point and thus the process is branched to st107.

When the value of the arithmetically decoded pixel is not varied, the run length counting device B73 is incremented (st104) to update the run length information. Subsequently, the shift register B72 is shifted toward the left by one bit (st105). Then, the value of one bit corresponding to one pixel decoded by the arithmetic decoding device 71 at st101 is shifted into (st106) the LSB bit of the shift register B72. Then, the process is continued.

On the other hand, when the pixel value is varied, on the basis of the value obtained with reference to the value of the run length counting device B73, MH coding by the MH coding device 74 is performed on the basis of the obtained run length and the MH code is stored in the MH coded image data storage device 78 (st107).

Subsequently, the run length counting device B73 is initialized (st108). Then, a check is performed as to whether or not the MH coding process in the MH coding device 74 is for the last pixel of the objective line for code conversion currently processed (st109). If the current MH coding process is not for the last pixel of the objective line, the process subsequent to st104 is executed.

On the other hand, when the currently processed pixel is the last pixel of the objective line, the contents of the shift register A77, the shift register B72 and the shift register C80 are initialized (st110). Then, a check is performed as to whether or not the code conversion for the predetermined number of lines is completed (st111). If it is not completed, the process from st104 is executed, and if it is completed, the code conversion process is terminated (st112).

Next, the operation of the shift register A77 with making reference to the reference line will be discussed together with the process procedure illustrated in FIG. 18, which operation takes place in parallel to the operation illustrated in FIG. 17.

The code conversion system is initially initialized (st120). Then, one code word of the MH code in a reference line 90 which is two preceding lines from the objective line is subject to code conversion and stored in the MH coded image data storage device 78, is decoded by the MH decoding device 76 (st121). Then, an obtained run length is set in the run length counting device A75 (st122).

Subsequently, in order to hold setting of the next pixel until the arithmetic decoding process by the arithmetic decoding device 71 is completed, the shift register A77 waits for the decoding completion signal from the arithmetic decoding device 71 (st127).

Then, when the arithmetic decoding completion signal is supplied from the arithmetic decoding device 71, the shift register A77 shifts data toward the left by one bit (st123). Then, a one bit value corresponding to the value of the pixel of run length decoded by the MH decoding process (st121) of the MH decoding device 76 is shifted into the LSB bit of the shift register A77 (st124).

Next, the pixel setting completion signal is fed to the arithmetic decoding device 71 (st128). The pixel setting completion signal is a signal indicative of completion of setting of the pixel of the template to the shift register A77 storing the template in the reference line 90.

Subsequently, the run length counting device A75 decrements the counted value (st125). Then, a check is performed to see if the value of the run length counting device A75 becomes zero as a result of the decrementing process (st125) of the run length counting device A75 (st126).

When the run length counting device A75 is not zero, the process from st127 is executed again. On the other hand, when the run length counting device A75 is zero, a process from MH decoding process (st121)in the MH decoding device 76 is executed to update the run length counting device A75 and the value of the pixel.

Next, discussion will be given for the operation of the shift register C80 making reference to the reference line together with the process illustrated in FIG. 19 which is to be executed simultaneously with the processes illustrated in FIGS. 17 and 18.

As shown in FIG. 19, initialization of the code conversion system is initially performed (st130). One code word of a reference line 91 which precedes the objective line for code conversion stored in the MH coded image stored device 78 by one line for code conversion stored in the MH coded image data storage device 78, is decoded by the MH decoding device 76 (st131). The obtained run length is set in the run length counting device C79 (st132).

Next, in order to hold the process of setting the next pixel in the shift register C80 until the arithmetic decoding process in the arithmetic decoding device 71 is completed, the shift register C80 waits for the arithmetic decoding completion signal from the arithmetic decoding device 71 (st137).

When the arithmetic decoding completion signal is received from the arithmetic decoding device 71, the shift register C80 shifts the holding data toward the left by one bit (st133). For the LSB bit of the shift register C80, a one bit value corresponding to the pixel of the run length obtained in the MH decoding process of the MH decoding device 76 (st134) is shifted in.

Next, the pixel setting completion signal is fed (st138) the arithmetic decoding device 71. The pixel setting completion signal is a signal indicative of completion of setting of the pixel of the template in the shift register C80 storing the template in the reference line 91.

Subsequently, the run length counting device C79 is decremented (st135). Then, a check is performed to see if the run length stored in the run length counting device C79 becomes zero as a result of the decrementing process (st135) of the run length counting device C79 (st136).

If the run length in the run length counting device C79 is not zero, the process from st137 is repeatedly executed. On the other hand, when the run length counting device C79 is zero, the process from the MH deciding process (st131) is executed in the MH decoding device. In conjunction therewith, the run length counting device C79 and the value of the pixel are updated.

Sixth Embodiment

Figure 16:
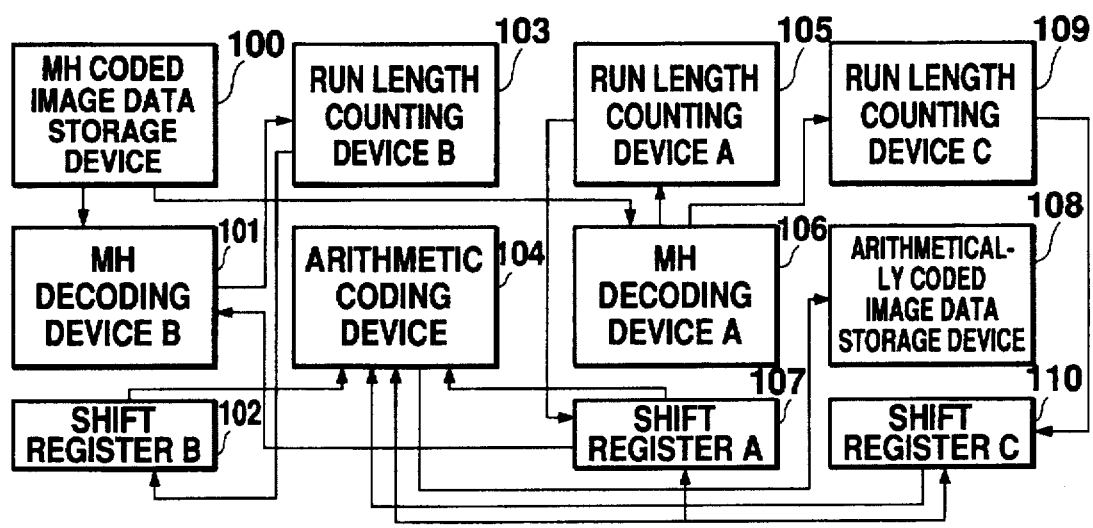
FIG. 16 is an illustration showing a construction of the sixth embodiment of the code conversion system according to the invention.

The construction of the sixth embodiment of the code conversion system according to the invention is illustrated in FIGS. 16 and 15. FIG. 16 is an illustration showing a construction of a system for converting the MH coded image data into the binary arithmetically coded image data code.

In FIG. 16, an MH coded image data storage device 100 stores the MH coded image data. An MH decoding device B101 loads the MH coded image data stored in the MH coded image data storage device 100 to feed a run length obtained by MH decoding of one code word of the MH code in the objective line for code conversion, to the run length counting device B103.

On the other hand, the shift register B102 stores the image data of the template of the objective line 92 for coding, corresponding to the shift register B. The image data stored in the shift register B102 is shifted by one bit whenever one pixel in the image data is coded by the arithmetic coding device 104. A run length counting device B103 receives the run length of one code word from the MH decoding device 101, counts the run length and outputs each pixel to the shift register B102 every time one pixel is subjected to arithmetic coding.

The arithmetic coding device 104 performs arithmetic coding of the objective pixel 53 for coding employing a template formed from the shift register A107 and the shift register B102, as shown in FIG. 15. The arithmetic code thus coded is stored in the arithmetically coded image data storage device 108. The run length counting device A105 receives the run length of one code word decoded by the MH decoding apparatus A106 from the MH decoding device A106, counts the run length and outputs to the shift register A107 for one pixel an every occurrence of arithmetic coding of one pixel.

The MH decoding device 106 loads the MH coded image data storage device 800 stored in the MH coded image data and performs MH decoding for one code word of the MH code of the template 93 of the reference line 90 corresponding to the shift register A107 to transfer the run length of the MH code to the run length counting device A105. The shift register A107 stores the image data corresponding to the template 93 of the reference line 90 and shifts one bit at every occurrence of coding for one pixel of the object pixels 94 for coding by the arithmetic coding device 104.

The arithmetically coded image data storage device 108 receives the arithmetic code coded by the arithmetic coding device 104 from the arithmetic coding device 104 and thus stores the arithmetically coded image data.

A run length counting device C109 receives a run length of one code word of the MH coded image data of the template corresponding to the register C among the MH coded image data which are already MH coded, and counts the same. A shift register C110 stores the image data of the template of the reference line 91 corresponding to the shift register C, shown in FIG. 15 and shifts the image data for one bit on every occurrence of decoding of one pixel in the image data by the arithmetic decoding device 101.

Figure 20:
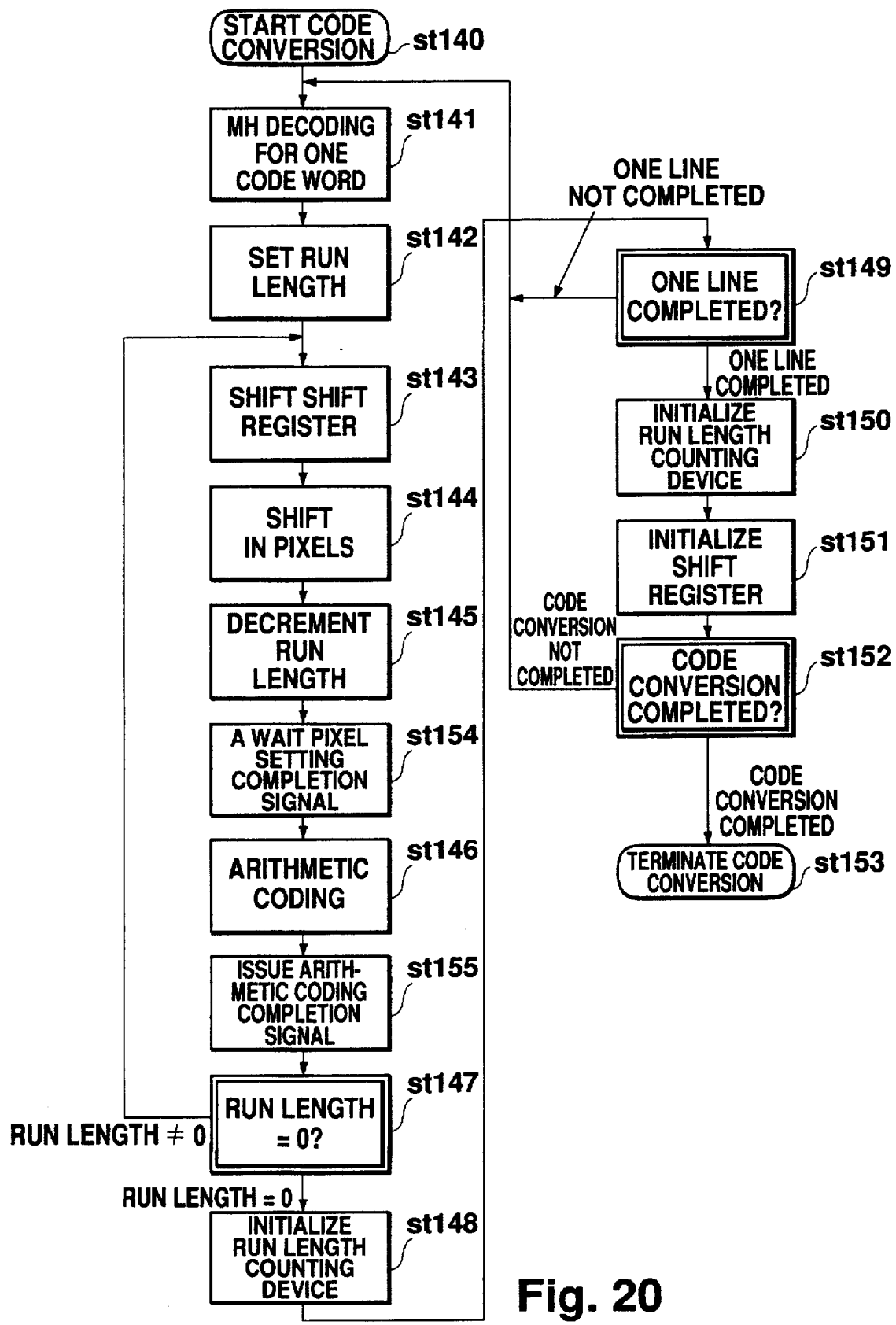
FIG. 20 is also a flowchart showing an operation of the sixth embodiment of the code conversion system according to the invention.

FIG. 20 is an illustration showing a process for code conversion of the objective line of the system from NH coded image data to binary arithmetically coded image data. The operation for converting from the MH code into the arithmetic code will be discussed with reference to FIG. 20.

At first, initialization of the device is performed (st140). One code word of the MH coded image data stored in the MH coded image data storage device 100 is decoded by the MH decoding device B101 to output the run length corresponding to one code word (st141). In the foregoing process, the run length of one code word output from the MH decoding device B101 is set in the run length counting device B103 (st142).

Next, the shift register B102 shifts the registered data toward the left by one bit (st143). Then, a one bit value corresponding to the pixel of the run length obtained through the MH decoding process is shifted into the LSB bit of the shift register B102 (st144).

Next, the run length counting device B103 is decremented (st145). Then, the pixel setting completion signal from the shift register A107 storing the template in the reference line 90 necessary for arithmetic coding by the arithmetic coding device 104, and the pixel setting complete signal from the shift register C110 storing template in the reference line 91, are awaited (st154).

Next, when the image setting completion signals are received from the shift register A107 and the shift register C110, with the shift register A77, the shift register B72 and the shift register C80 constituting the template 93 shown FIG. 15 as the context 95, the arithmetic coding device 104 performs arithmetic coding (st146). The arithmetic code output at this time is stored in the arithmetically coded image data storage device 108.

After completion of the arithmetic coding process, the arithmetic coding device 104 issues an arithmetic coding completion signal to the shift register A107 and the shift register C110 (st155). The shift register A107 thus initiates a process for setting of the next pixel shown in FIG. 21. Also, the shift register C110 initiates setting of the next pixel shown in FIG. 22.

Next, judgement is made as to whether or not the run length of the run length counting device B103 decremented through the foregoing process is zero (st147). When the judged result is that the run length stored in the run length counting device B103 is not zero, the process from st143 is repeated.

On other hand, when judgement is made that the run length is zero, one code word of the MH code is decoded in the MH decoding device B101. In order to load the decoded data into the shift register 102, the run length counting device B103 is initialized (st148).

Thereafter, the objective pixel for coding currently converted through the code conversion process set forth above is judged to see if the current objective pixel is the last pixel of the objective line 101 for code conversion stored in the MH coded image data storage device, or not (st149). If the currently processed objective line 92 for code conversion is not the last pixel, the process from st141 is repeatedly executed. On the other hand, if the currently processed objective pixel is the last pixel, as preparation for the code conversion of the next line among the objective lines for code conversion, the run length counting device A105 and the run length counting device C109 are initialized (st150), and the shift register A107, the shift register B102 and the shift register C110 are initialized (st151).

Subsequently, judgment is made as to whether or not code conversion is complete by determining if the last objective line coded is the last line of image data stored in the MH coded image data storage device (st152). If the code conversion is complete, a termination process is performed (st153). If the code conversion is not complete, the foregoing process from st141 is repeated.

Figure 21:
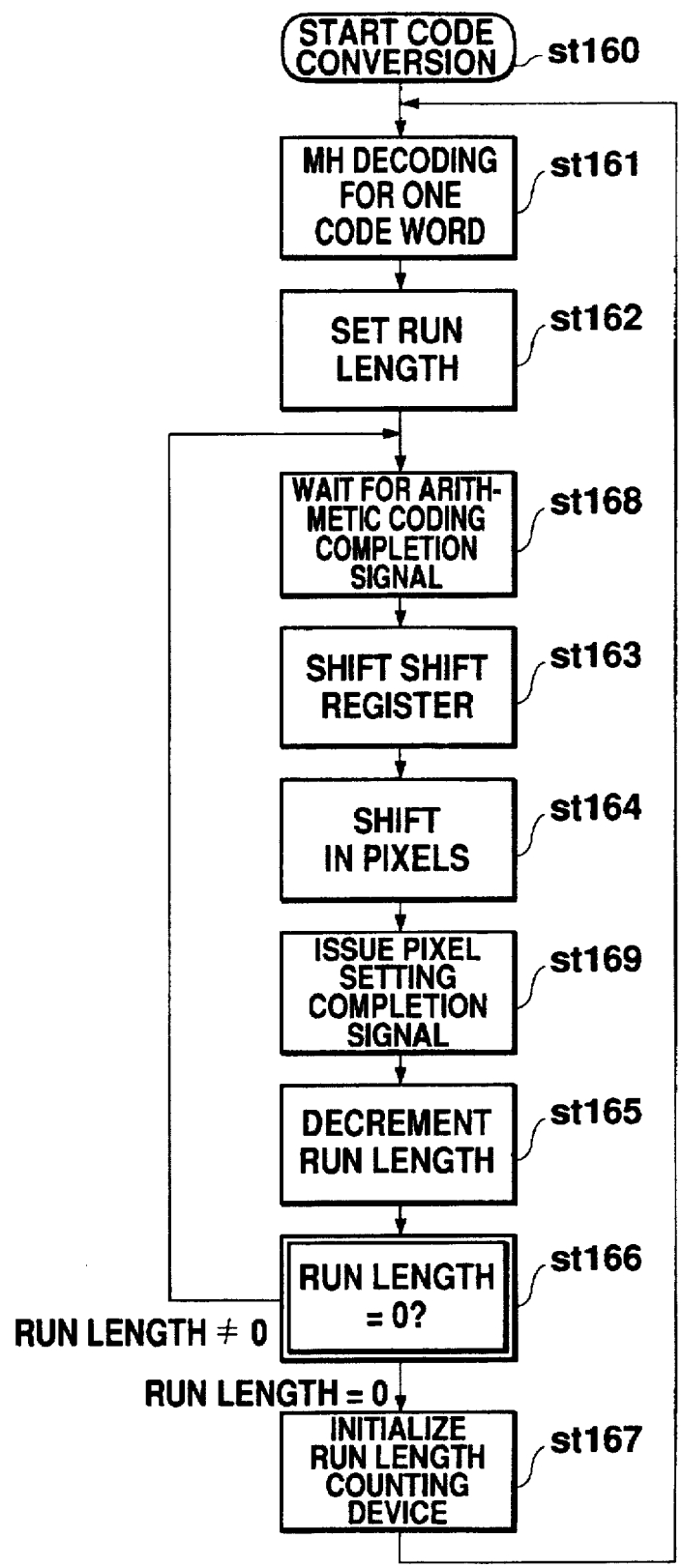
FIG. 21 is also a flowchart showing an operation of the sixth embodiment of the code conversion system according to the invention.

Next, the operation of the shift register A107 making reference to the reference line will be discussed together with the operation of the process in the procedure illustrated in FIG. 21 as well as the operation for the process shown in FIG. 20.

When the code conversion is initiated (st160), one code word of the MH coded image data of the reference line in the template necessary for the arithmetic coding process is MH decoded by the MH decoding device A106 to output the run length corresponding to the one code word (st161). The run length of one code word of the MH code thus obtained, is set in the run length counting device A102 (st161).

Next, for holding setting of the next pixel to the shift register A107 until the arithmetic coding device 104 completes the arithmetic coding process, the shift register A107 waits for the arithmetic coding completion signal input from the arithmetic coding device 104 (st168).

After receiving the arithmetic coding completion signal from the arithmetic coding device 104, the shift register A107 shifts the data toward the left by one bit (st163). The one bit value corresponding to the pixel of the run length obtained through the MH decoding process (st161) is shifted into the LSB of the shift register (st164).

Next, the pixel setting completion signal representative of completion of the process for setting the pixel of the template into the shift register A107 which stores the template in the reference line, is fed to the arithmetic coding device 104 (st169).

Subsequently, the run length counting device A105 is decremented (st165). Then, a check is performed as to whether or not the run length stored in the run length counting device A105 is zero (st166). When the result of checking indicates that the run length stored in the run length counting device A105 is not zero, the foregoing process from st168 is repeated.

On the other hand, if the run length stored in the run length counting device A105 is zero, the run length counting device A105 is initialized for decoding one code word of the MH code in the reference line 90 of the shift register A105 corresponding to the next template 93 and loading it into the shift register A105 (st167).

Next, the operation of the shift register C110 which makes reference to the reference line will be discussed together with the procedure illustrated in FIG. 22 to be performed simultaneously with the process shown in FIG. 21.

Figure 22:
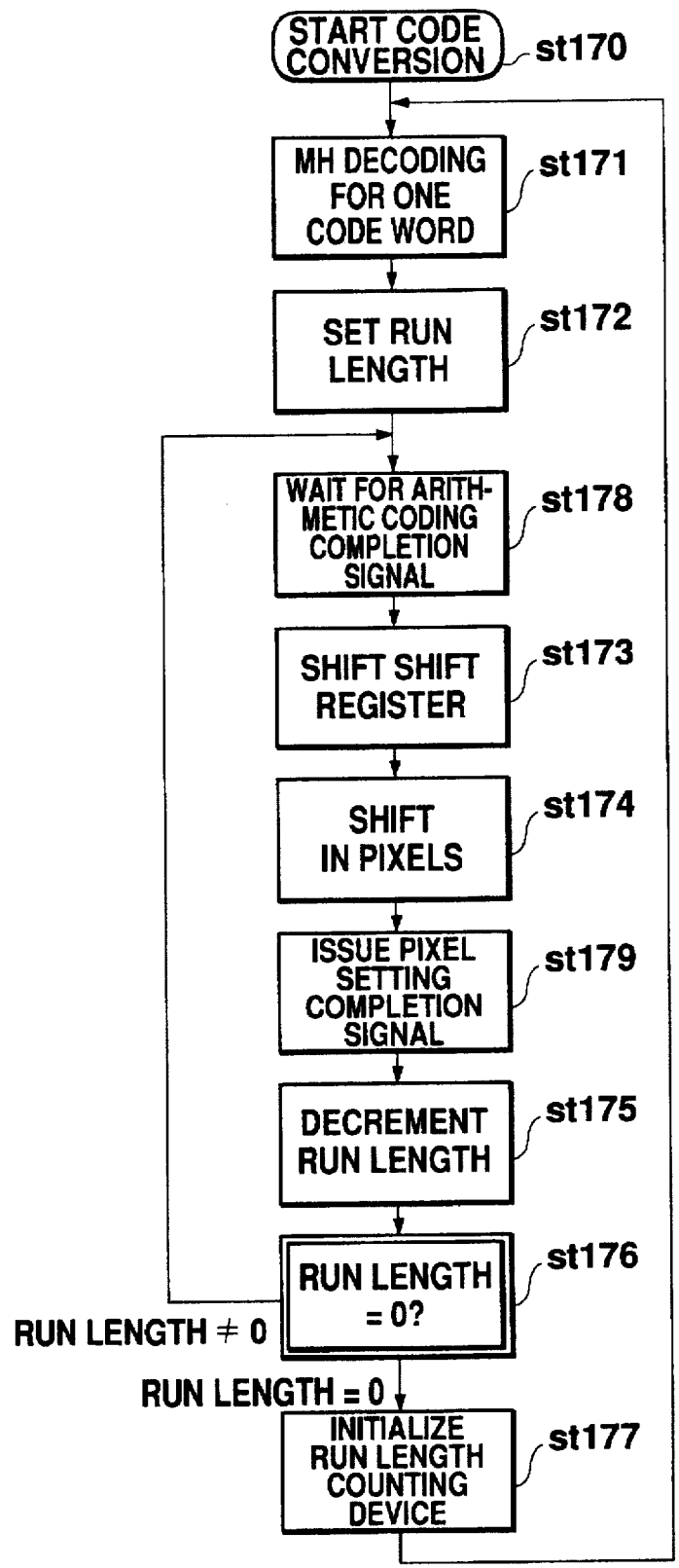
FIG. 22 is also a flowchart showing an operation of the sixth embodiment of the code conversion system according to the invention.

As shown in FIG. 22, when the code conversion is initiated (st170), one code word of the MH coded image data of the reference line 91 in the template 93 necessary for the arithmetic coding process in the arithmetic coding device 104 is MH decoded by the MH decoding device A106, to output the run length corresponding to one code word (st171). The run length of one code word of the MH code obtained through the MH decoding process (st171) is set in the run length counting device (st172).

Next, in order to hold a process for setting the next pixel in the shift register C110 until completion of the arithmetic coding process of the arithmetic coding device 103, the arithmetic coding completion signal from the arithmetic coding device 104 is awaited (st178).

Next, when the arithmetic coding completion signal is received from the arithmetic coding device 104, the shift register C110 shifts the holding data toward the left by one bit (st173). Then, the one bit value corresponding to the pixel of the run length obtained through the foregoing MH decoding process (st171) is shifted into the LSB of the shift register C110 (st174).

Thereafter, the pixel setting completion signal, indicative that the setting of a pixel of the template into the shift register C110 is completed, is fed to the arithmetic coding device 104 (st179).

Next, the run length counting device 109 is decremented (st175). Then, a check is performed as to whether or not the run length stored in the run length counting device C109 becomes zero (st176). If the run length stored in the run length counting device C109 is not zero, the process from st178 is repeated.

On the other hand, if the run length stored in the run length counting device C109 is zero, the run length counting device C109 is initialized in order to decode one code word of the MH code in the reference line 91 of the shift register C110 corresponding to the template 93, and to load it into the shift register C110 (st177).

Seventh Embodiment

Figure 23:
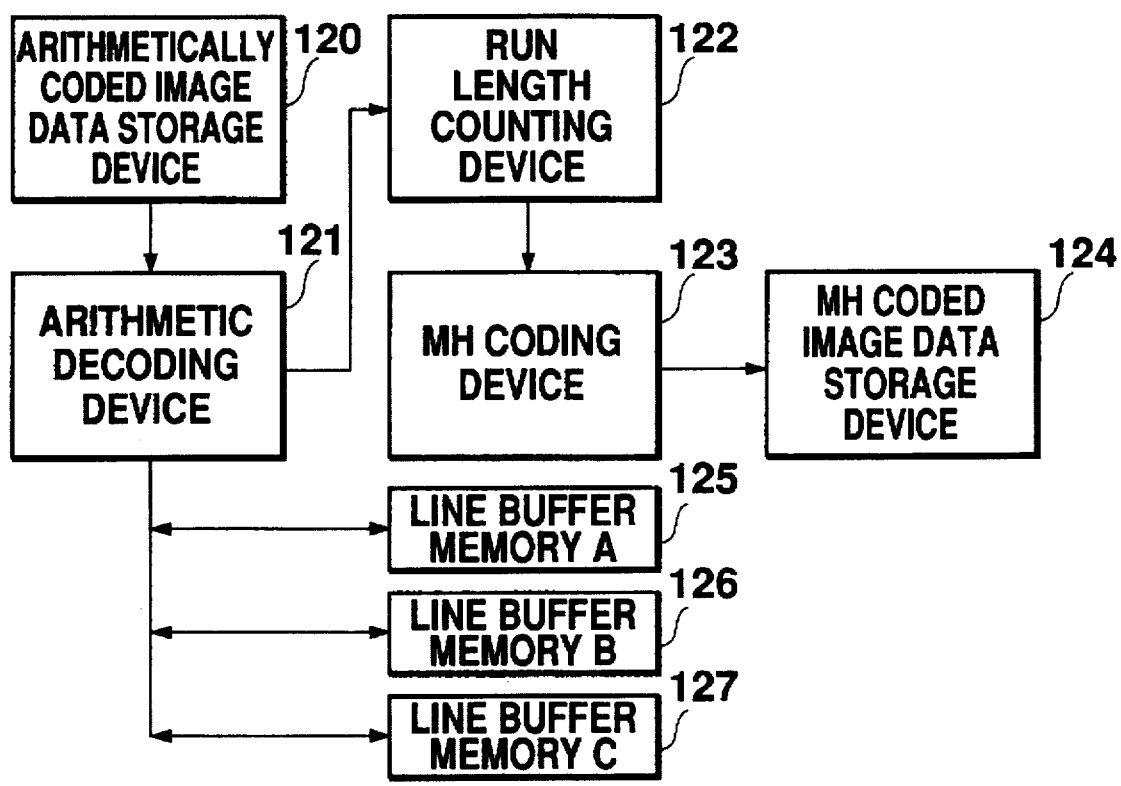
FIG. 23 is an illustration showing a construction of the seventh embodiment of the code conversion system according to the invention.

The seventh embodiment of the code conversion system according to the present invention is illustrated in FIG. 23. The code conversion system of FIG. 23 has a construction adapted to convert a binary arithmetically coded image data which is arithmetically coded by an arithmetic coding system defined by CCITT T. 82 into an MH code as one dimensional code.

In FIG. 23, an arithmetically coded image data storage device 120 stores an arithmetically coded image data. An arithmetic decoding device 121 decodes the arithmetically coded image data stored in the arithmetically coded image data storage device 120 and sets the decoded data into a line buffer memory A125, B126 or C127.

A run length counting device 122 receives data of one pixel from the arithmetic decoding device 121 simultaneously with the line buffer memory A125, B126 or C127 and counts the run length of pixels of the same type until a variation point of the pixels, constituted by a pixel of a different type, is detected. The run length counting device 122 feeds the run length to a MH coding device 123. The MH coding device 123 converts the run length fed from the run length counting device 122 into a MH code word to set in a MH coded image data storage device 124. A line buffer memory A124 is the MH coded image data storage device for storing the MH coded image data. The line buffer memory A125 stores the one line of non-coded image data.

On the other hand, the line buffer memory B126 is used for alternately reading and writing together with the line buffer memory A125 or C127. The line buffer memory C127 is used for alternately reading and writing together with the line buffer memory A125 or B126.

Figure 24:
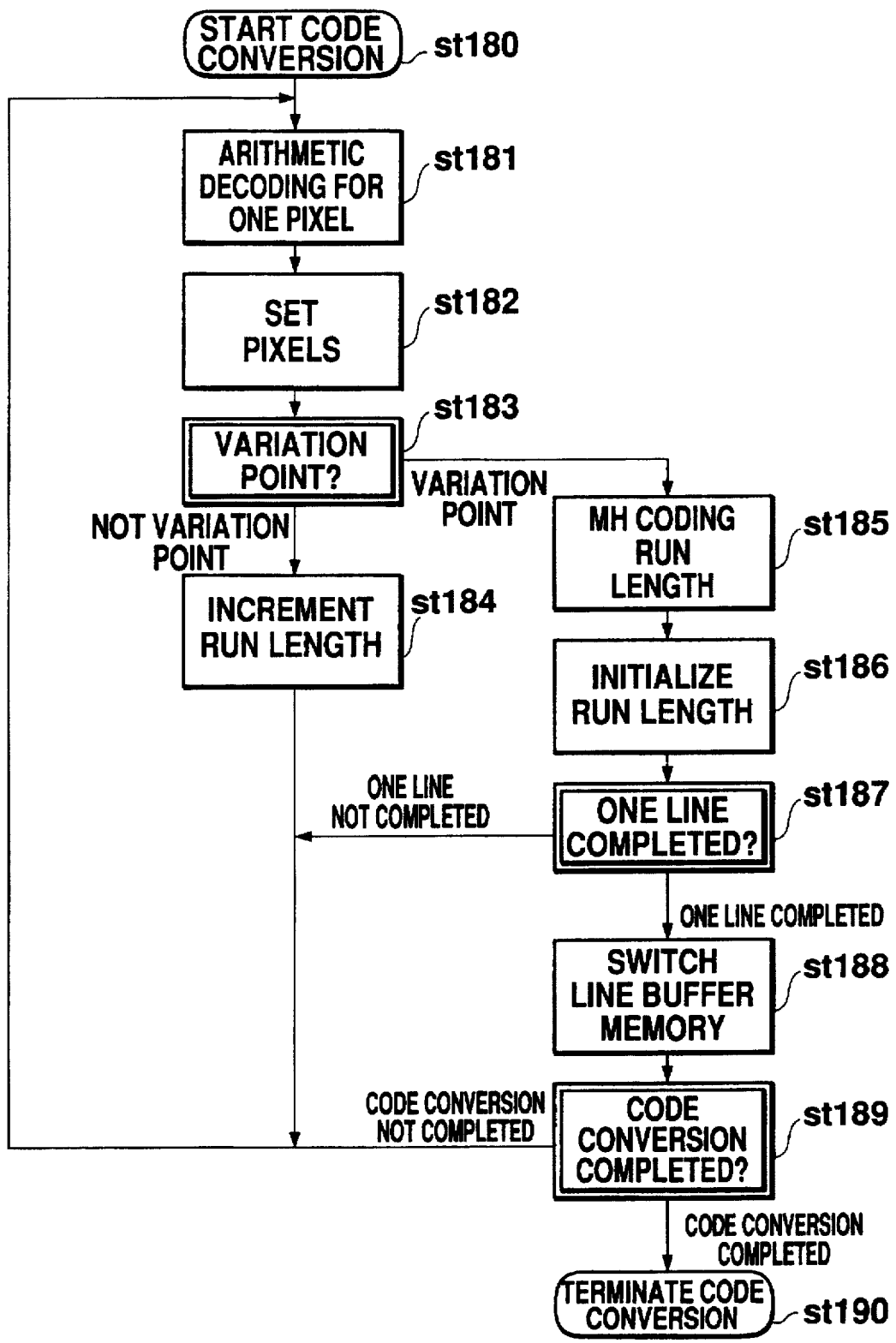
FIG. 24 is a flowchart showing an operation of the seventh embodiment of the code conversion system of the invention.
Figure 25:
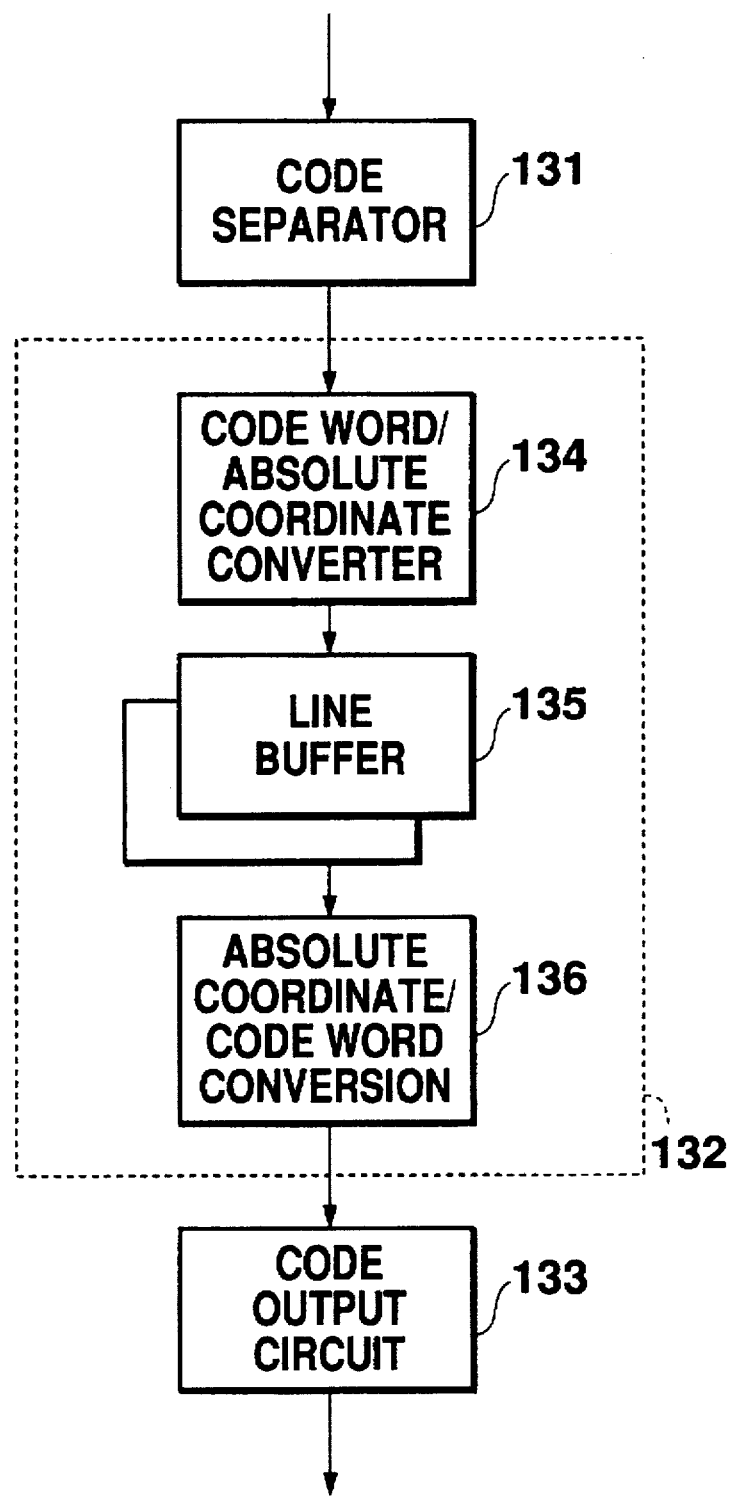
FIG. 25 is an illustration showing the construction of the conventional code conversion system.
Figure 26:
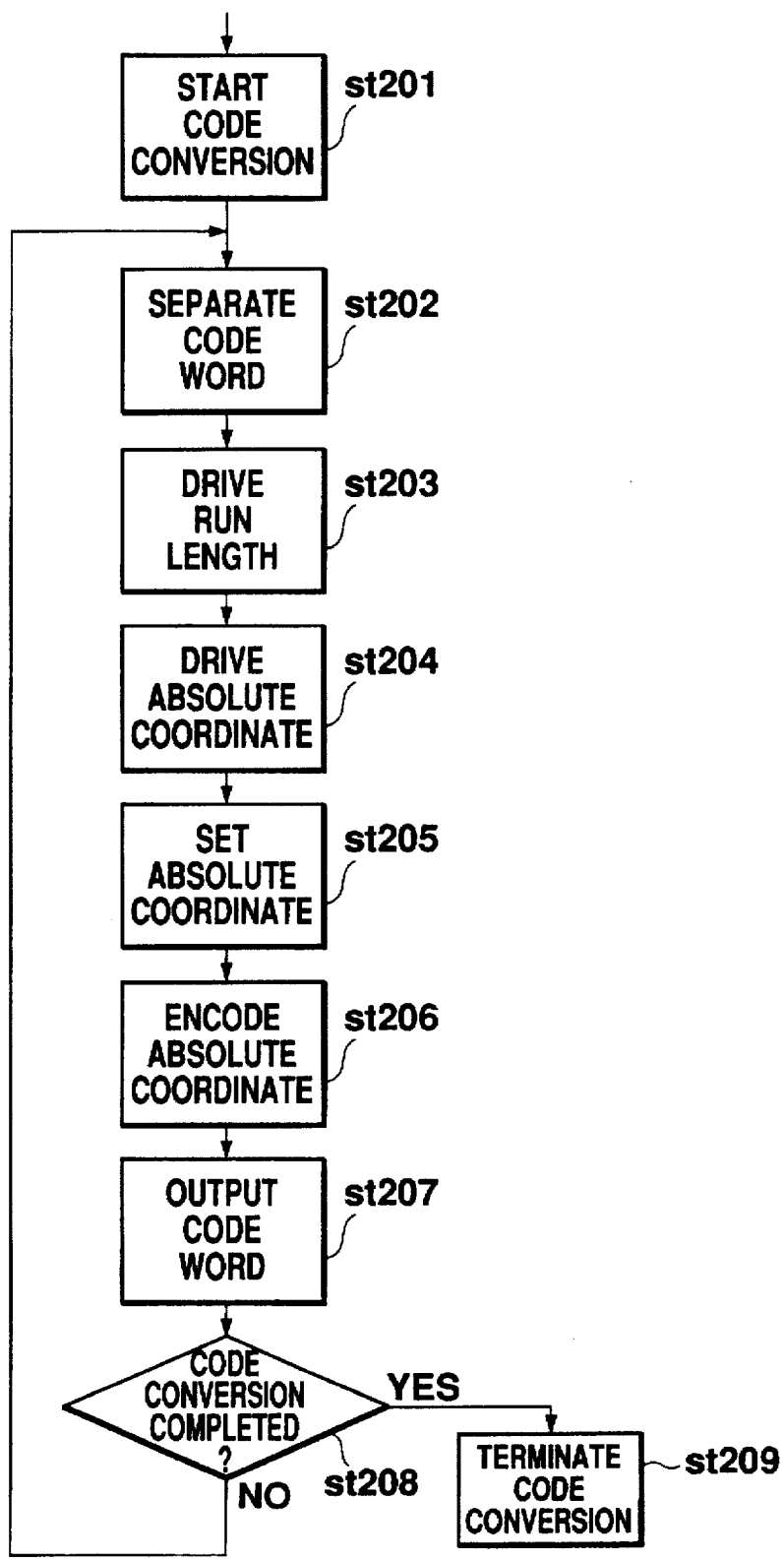
FIG. 26 is a flowchart showing the operation of the conventional code coding system.
Figure 27:
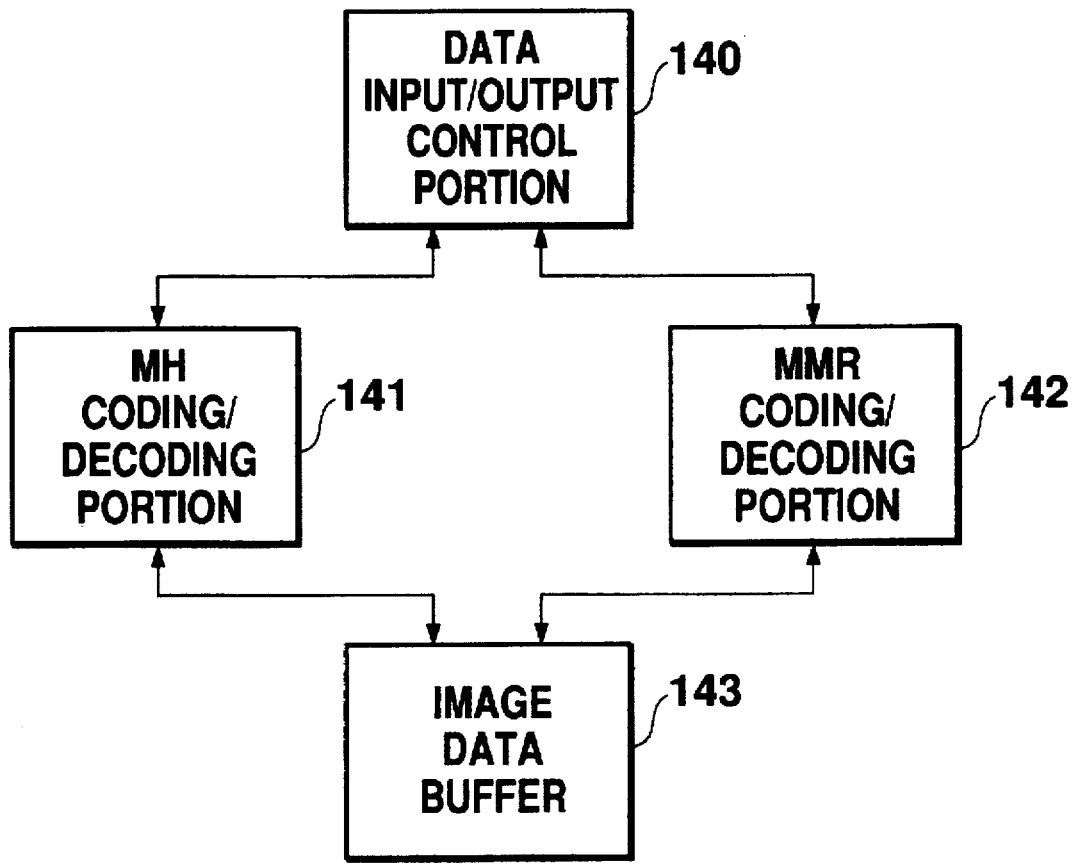
FIG. 27 is an illustration showing the conventional code conversion system.

Discussion will be given of the operation of the shown embodiment with reference to the code conversion processing procedure illustrated in FIG. 24.

In the arithmetic decoding device 121, one pixel is decoded (st181). The decoded data is set at a predetermined position of the line buffer memory C127 which stores the image data of the objective line 32 for code conversion as shown in FIG. 5(a).

Next, the pixel and the pixel decoded in the preceding process are compared (st183). If both pixels are the same value, the run length counting device 122 is incremented (st184) and the foregoing operation from one pixel decoding process for the arithmetic code is repeated.

On the other hand, if the pixels have different values, the variation point can be judged. Then, the run length is obtained from the run length counting device 122. The run length thus obtained is MH coded by the MH coding device 123. The obtained MH code word is stored in the MH coded image storage device 124 (st185).

Thereafter, the run length counting device 122 is initialized for next run length counting, and a check is performed as to whether code conversion for the current objective line 32 for code conversion is completed (st187). As a result of judgement, if the cover conversion for the current objective line for code conversion has not been completed, the foregoing process is again repeated from one pixel decoding for the arithmetic code (st181). On the other hand, when the cover conversion for the current objective line for code conversion has been completed, the line buffer memory A125 which stores the pixels of reference line (line n−2) 30 is set to store the pixels of the objective line (line n+1) for next code conversion (st188).

On the other hand, the line buffer memory B126 storing the pixels of the reference line (line n−1) 31 and the line buffer memory C127 storing the pixels of the objective line (line n) 32, already store lines necessary for code conversion, and thus are not changed.

Next, a check is performed as to whether or not a code conversion process is completed for a predetermined number of lines (st189). If the code conversion process has been completed, the process is terminated (st190), and otherwise necessary operations from one pixel decoding for the arithmetic code are repeated (st181).

As set forth above, according to the present invention, the coded image data can be sequentially processed for code conversion instead of requiring total conversion at one time. Therefore, required buffer memory capacity can be made smaller.

Also, in installation of hardware, a decoding process necessary for decoding conversion for the code and a coding process can be executed simultaneously, and it can realize a high speed code conversion.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope and equivalents thereof encompassed with respect to the features set out in the appended claims.

What is claimed is:

1. A code conversion system comprising:

first storage means for storing arithmetically coded image data;

arithmetic decoding means for decoding the arithmetically coded image data stored in said first storage means on the basis of predetermined reference pixels for outputting original image data;

a line buffer memory for storing at least a predetermined number of scanning lines of said original image data output from said arithmetic decoding means;

one dimensional image coding means for receiving said original image data from said line buffer memory, performing one dimensional image coding and outputting one dimensional image coded data;

second storage means for storing said one dimensional image coded data output from said one dimensional image coding means; and at least two shift registers, coupled to the arithmetic decoding means, which shift in respective reference pixels upon completion of decoding by the arithmetic decoding means;

said arithmetic decoding means reading out said predetermined reference pixels from said line buffer memory; and said predetermined number of scanning lines being scanning lines including said predetermined reference pixels;

wherein said arithmetic decoding means decoding said arithmetically coded image data notifies completion of decoding of a predetermined number of image data to said one dimensional image coding means for coding decoded image data in said line buffer memory employing a one dimensional image coding system, using a decoding completion signal; and the one dimensional image coding means notifying completion of coding of the predetermined number of image data to said arithmetic decoding means, with a coding completion signal.

2. A code conversion system comprising:

first storage means for storing arithmetically coded image data;

arithmetic decoding means for decoding the arithmetically coded image data stored in said first storage means on the basis of predetermined reference pixels for outputting original image data;

a line buffer memory for storing at least a predetermined number of scanning lines of said original image data output from said arithmetic decoding means;

one dimensional image coding means for receiving said original image data from said line buffer memory, performing one dimensional image coding and outputting one dimensional image coded data;

second storage means for storing said one dimensional image coded data output from said one dimensional image coding means;

said arithmetic decoding means reading out said predetermined reference pixels from said line buffer memory;

said predetermined number of scanning lines being scanning lines including said predetermined reference pixels;

run length counting means for receiving decoded image data from said arithmetic decoding means and counting continuously appearing white pixels or black pixels on a common scanning line with respect to a first scanning line including an objective pixel for decoding, and a second scanning line immediately preceding said first scanning line; and two shift registers decoding a value corresponding to objective pixels for decoding from two lines of run length information including said predetermined pixels and sequentially shifting in respective reference pixels relative to the first and second scanning lines, for holding the reference pixels necessary for a decoding process of said arithmetic decoding means, upon performing decoding by said arithmetic decoding means;

said arithmetic decoding means selecting reference pixels from image data in said two shift registers when reference pixels to be used for coding of the objective pixel are included in the first and second scanning lines with respect to the objective pixel as the object for arithmetic decoding among arithmetically coded image data, and said one dimensional coding means performing coding by inputting run length information associated with the scanning line including the objective pixel for coding among run length information when said image data is to be coded.

3. A code conversion system comprising:

first storage means for storing arithmetically coded image data;

arithmetic decoding means for decoding the arithmetically coded image data stored in said first storage means on the basis of predetermined reference pixels for outputting original image data;

a line buffer memory for storing at least a predetermined number of scanning lines of said original image data output from said arithmetic decoding means;

one dimensional image coding means for receiving said original image data from said line buffer memory, performing one dimensional image coding and outputting one dimensional image coded data;

second storage means for storing said one dimensional image coded data output from said one dimensional image coding means;

said arithmetic decoding means reading out said predetermined reference pixels from said line buffer memory;

said predetermined number of scanning lines being scanning lines including said predetermined reference pixels;

three run length counting means for receiving decoded image data from said arithmetic decoding means and counting continuously appearing white pixels or black pixels on a common scanning line with respect to a first scanning line including an objective pixel for decoding, and second and third scanning lines, the second and third scanning lines located immediately before and two lines before said first scanning line; and three shift registers decoding values corresponding to objective pixels for decoding from three lines of run length information including said predetermined reference pixels and sequentially shifting in respective reference pixels relative to the first, the second and the third lines, for holding reference pixels necessary for a decoding process of said arithmetic decoding means, upon performing decoding by said arithmetic decoding means for selecting the reference pixels among the first, the second and the third scanning lines;

said arithmetic decoding means selecting reference pixels from image data in said three shift registers when reference pixels to be used for coding of the objective pixel are included in the first, the second and the third scanning lines with respect to the objective pixel as the object for arithmetic decoding among the arithmetically coded image data, and said one dimensional coding means performing coding by inputting run length information associated with the first, the second and the third scanning lines including objective pixels for coding among the run length information when said image data is to be coded.

4. A code conversion system comprising:

first storage means for storing arithmetically coded image data;

arithmetic decoding means for decoding the arithmetically coded image data stored in said first storage means on the basis of predetermined reference pixels for outputting original image data;

a line buffer memory for storing at least a predetermined number of scanning lines of said original image data output from said arithmetic decoding means;

one dimensional image coding means for receiving said original image, data from said line buffer memory, performing one dimensional image coding and outputting one dimensional image coded data;

second storage means for storing said one dimensional image coded data output from said one dimensional image coding means;

at least two shift registers, coupled to the arithmetic decoding means, which shift in respective reference pixels upon completion of decoding by the arithmetic decoding means; and run length counting means for counting run length of said original image data output per one pixel output from said arithmetic decoding means decoding arithmetically coded image data to said one dimensional image coding means for coding employing a one dimensional image coding system;

said one dimensional image coding means performs coding on the basis of the run length counted by said run length counting means;

said arithmetic decoding means reading out said predetermined reference pixels from said line buffer memory; and said predetermined number of scanning lines being scanning lines including said predetermined reference pixels.

5. A code conversion system comprising:

first storage means for storing one dimensional coded image data;

one dimensional image decoding means for reading out said one dimensional image coded data from said first storage means;

a line buffer memory receiving the one dimensional coded image data decoded by said one dimensional image decoding means, and storing a predetermined number of scanning lines of said decoded one dimensional coded image data including pixels to be used as reference pixels upon coding according to an arithmetic coding system;

arithmetic coding means for taking coding objective pixels and coding reference pixels from said decoded one dimensional coded image data in said line buffer memory and performing arithmetic coding;

second storage means for receiving arithmetically coded image data from said arithmetic coding means and storing the arithmetically coded image data; and at least two shift registers, coupled to the one dimensional image decoding means, which receive a plurality of reference pixels from the one dimensional image decoding means and which shift a new reference pixel in each register when the arithmetic coding means receives a decoding completion signal;

wherein said one dimensional image decoding means for decoding said one dimensional coded image data notifies the arithmetic coding means of completion of decoding of a predetermined number of one dimensional coded image data using a decoding completion signal, said arithmetic coding means then arithmetically codes the decoded one dimensional coded image data on said line buffer memory; and said arithmetic coding means notifies completion of coding of the decoded predetermined number of one dimensional coded image data to said one dimensional image decoding means using a coding completion signal.

6. A code conversion system comprising:

first storage means for storing one dimensional coded image data;

one dimensional image decoding means for reading out said one dimensional image coded data from said first storage means;

a line buffer memory receiving the one dimensional coded image data decoded by said one dimensional image decoding means, and storing a predetermined number of scanning lines of said decoded one dimensional coded image data including pixels to be used as reference pixels upon coding according to an arithmetic coding system;

arithmetic coding means for taking coding objective pixels and coding reference pixels from said decoded one dimensional coded image data in said line buffer memory and performing arithmetic coding;

second storage means for receiving arithmetically coded image data from said arithmetic coding means and storing the arithmetically coded image data;

two run length counting means for linearly decoding said one dimensional coded image data and counting a number of continuously appearing whim pixels or black pixels on a scanning line with respect to a decoded first scanning line and a second scanning line immediately preceding said decoded first scanning line; and two shift registers sequentially decoding values of reference pixels corresponding to objective pixels for decoding from run length information of three scanning lines including the reference pixels and shifting into the two shift registers said reference pixels necessary for a coding process by said arithmetic coding means when arithmetic coding is performed for a selecting reference image from three scanning lines, said arithmetic decoding means performing arithmetic coding employing said two shift registers holding said reference pixels.

7. A code conversion system comprising:

first storage means for storing one dimensional coded image data;

one dimensional image decoding means for reading out said one dimensional image coded data from said first storage means;

a line buffer memory receiving the one dimensional coded image data decoded by said one dimensional image decoding means, and storing a predetermined number of scanning lines of said decoded one dimensional coded image data including pixels to be used as reference pixels upon coding according to an arithmetic coding system;

arithmetic coding means for taking coding objective pixels and coding reference pixels from said decoded one dimensional coded image data in said line buffer memory and performing arithmetic coding;

second storage means for receiving arithmetically coded image data from said arithmetic coding means and storing the arithmetically coded image data;

three run length counting means for linearly decoding said one dimensional coded image data and counting a number of continuously appearing white pixels or black pixels on a scanning line with respect to a decoded first scanning line and second and third scanning lines immediately before and two lines before said decoded first scanning line; and three shift registers sequentially decoding values of reference pixels corresponding to objective pixels for decoding from run length information of three scanning lines including the reference pixels and shifting into the three shift registers said reference pixels necessary for a coding process by said arithmetic coding means when the arithmetic coding is performed for selecting reference image from three scanning lines, said arithmetic coding means performing arithmetic coding employing said three shift registers holding said reference pixels.

8. A code conversion system comprising:

a first storage device that stores arithmetically coded image data;

an arithmetic decoding device, coupled to the first storage device, that decodes the arithmetically coded image data stored in the first storage device and outputs original image data;

a buffer, coupled to the arithmetic decoding device, which stores at least a predetermined number of scanning lines of the original image data;

a one dimensional image coding device, coupled to the buffer, which receives the original image data from the buffer and outputs one dimensional image coded data;

a second storage device, coupled to the one dimensional image coding device, which stores the one dimensional image coded data;

at least two shift registers, coupled to the arithmetic decoding device, which shift in respective reference pixels upon completion of decoding by the arithmetic decoding device; and a run length counting device, coupled to the arithmetic decoding device, which counts a run length of the original image data per a one pixel output from the arithmetic decoding device.

9. The code conversion system of claim 8, wherein the one dimensional image coding device is coupled to a decoding completion signal line which transmits a decoding completion signal to notify the one dimensional image coding device that arithmetic decoding of the arithmetically coded image data is complete, and wherein the arithmetic decoding device is coupled to a coding completion signal line which transmits a coding completion signal to notify the arithmetic decoding device that one dimensional image coding is complete.

10. A code conversion system comprising:

a first storage device that stores arithmetically coded image data;

an arithmetic decoding device, coupled to the first storage device, that decodes the arithmetically coded image data stored in the first storage device and outputs original image data;

a buffer, coupled to the arithmetic decoding device, which stores at least a predetermined number of scanning lines of the original image data;

a one dimensional image coding device, coupled to the buffer, which receives the original image data from the buffer and outputs one dimensional image coded data;

a second storage device, coupled to the one dimensional image coding device, which stores the one dimensional image coded data;

a run length counting device, coupled to the arithmetic decoding device, which counts continuously appearing white pixels or black pixels on a common scanning line of the original image data; and at least two shift registers, coupled to the arithmetic decoding device, which shift in respective reference pixels upon completion of decoding by the arithmetic decoding device.

11. A method for converting code, comprising the steps of:

A. storing arithmetically coded image data in a first storage device;

B. decoding the arithmetically coded image data stored in said first storage device in an arithmetic decoding device, using predetermined reference pixels;

C. outputting original image data from said arithmetic decoding device to a one dimensional image coding device;

D. performing one dimensional image coding on the original image data in said one dimensional image coding device;

E. outputting one dimensional image coded data from said one dimensional image coding device;

F. storing the one dimensional image coded data output from said one dimensional image coding device in a second storage device;

G. counting continuously appearing white pixels or black pixels on a common scanning line of the original image data;

H. transferring a plurality of reference pixels from the arithmetic decoding device into at least two shift registers; and I. shifting respective reference pixels in each of said shift registers upon completion of decoding by the arithmetic decoding device.

12. The method for converting code of claim 11, further comprising the steps of:

storing at least a predetermined number of scanning lines of the original image data in a buffer when it is output from the arithmetic decoding device;

reading a plurality of predetermined reference pixels into the buffer using the arithmetic decoding device; and sending a predetermined reference pixel from the buffer to the one dimensional image coding device.

13. A code conversion system comprising:

a first storage device which stores one dimensional coded image data;

a one dimensional image decoding device, coupled to the first storage device, which reads the one dimensional coded image data output from the first storage device and provides decoded one dimensional image data;

a buffer, coupled to the one dimensional image decoding device, which stores a predetermined number of scanning lines of the decoded one dimensional coded image data;

an arithmetic coding device, coupled to the buffer, which arithmetically codes the decoded one dimensional coded image data;

a second storage means, coupled to the arithmetic coding device, which receives arithmetically coded image data from the arithmetic coding device; and at least two shift registers, coupled to the one dimensional image decoding device, which receive a plurality of reference pixels from the one dimensional image decoding device and which shift a new reference pixel in each register when the arithmetic coding device receives a decoding completion signal;

wherein the arithmetic coding device is coupled to a decoding completion signal line which transmits a decoding completion signal to notify the arithmetic coding device that one dimensional image decoding of the one dimensional coded image data is complete, and wherein the one dimensional image decoding device is coupled to a coding completion signal line which transmits a coding completion signal to notify the one dimensional image decoding device that arithmetic coding is complete.

14. A code conversion system comprising:

a first storage device which stores one dimensional coded image data;

a one dimensional image decoding device, coupled to the first storage device, which reads the one dimensional coded image data output from the first storage device and provides decoded one dimensional image data;

a buffer, coupled to the one dimensional image decoding device, which stores a predetermined number of scanning lines of the decoded one dimensional coded image data;

an arithmetic coding device, coupled to the buffer, which arithmetically codes the decoded one dimensional coded image data;

a second storage means, coupled to the arithmetic coding device, which receives arithmetically coded image data from the arithmetic coding;

wherein the arithmetic coding device is coupled to a decoding completion signal line which transmits a decoding completion signal to notify the arithmetic coding device that one dimensional image decoding of the one dimensional coded image data is complete, and wherein the one dimensional image decoding device is coupled to a coding completion signal line which transmits a coding completion signal to notify the one dimensional image decoding device that arithmetic coding is complete;

at least two run length counting devices, coupled to the one dimensional image decoding device, which count a run length with respect to first and second one dimensionally decoded scanning lines; and at least two shift registers, coupled to the one dimensional image decoding device, which receive a plurality of reference pixels from the one dimensional image decoding device and which shift a new reference pixel in each register when the arithmetic coding device receives a decoding completion signal.

15. A method for converting code, comprising the steps of:

A. storing one dimensional coded image data in a first storage device;

B. decoding the one dimensional coded image data stored in said first storage device using a one dimensional image decoding device to produce image data corresponding to decoded one dimensional coded image data;

C. arithmetically coding the image data corresponding to the decoded one dimensional image coded image data from said one dimensional image decoding device using an arithmetic coding device;

D. storing the arithmetically coded image data from said arithmetic coding device in a second storage device;

E. counting a run length with respect to one dimensional decoded scanning lines;

F. transferring a plurality of reference pixels from the one dimensional image decoding device into at least two shift registers; and G. shifting a new reference pixel in each register upon completion of decoding by the one dimensional image decoding device.

16. The method for converting code in claim 15, further comprising the steps of:

receiving the image data corresponding to the decoded one dimensional coded image data in a buffer from the one dimensional image decoding device;

storing a predetermined number of scanning lines of the image data, the predetermined number of scanning lines including pixels to be used as coding reference pixels; and sending coding objective pixels and the coding reference pixels of the image data from the buffer to an arithmetic coding device.

* * * * *